(12) United States Patent
Boyles et al.

(10) Patent No.: US 8,378,624 B2
(45) Date of Patent: *Feb. 19, 2013

(54) BATTERY CHARGER

(75) Inventors: Samuel Boyles, Easley, SC (US);
Anthony Thomas Tocco, Anderson, SC (US); Umesh Rajani, Anderson, SC (US); Mike Hornick, Anderson, SC (US)

(73) Assignee: Techtronic Power Tools Technology Limited, Tortola, (VG)

( * ) Notice: Subject to any disclaimer, the term of this patent is extended or adjusted under 35 U.S.C. 154(b) by 597 days.

This patent is subject to a terminal disclaimer.

(21) Appl. No.: 12/555,573

(22) Filed: Sep. 8, 2009

(65) Prior Publication Data

US 2010/0060232 A1    Mar. 11, 2010

Related U.S. Application Data

(60) Provisional application No. 61/095,033, filed on Sep. 8, 2008, provisional application No. 61/097,004, filed on Sep. 15, 2008, provisional application No. 61/121,424, filed on Dec. 10, 2008.

(51) Int. Cl.
*H02J 7/00* (2006.01)

(52) U.S. Cl. .................. 320/107; 320/106; 320/114

(58) Field of Classification Search .................. 320/106, 320/107, 114
See application file for complete search history.

(56) References Cited

U.S. PATENT DOCUMENTS

| | | | |
|---|---|---|---|
| 3,644,873 A | 2/1972 | Dalton et al. | |
| 4,225,814 A | 9/1980 | Gantz et al. | |
| 4,227,140 A | 10/1980 | Nardella et al. | |
| 4,558,270 A | 12/1985 | Liautaud et al. | |
| 4,641,077 A | 2/1987 | Pascaloff | |
| 4,645,995 A | 2/1987 | Terrell et al. | |
| 4,698,579 A | 10/1987 | Richter et al. | |
| 4,739,242 A | 4/1988 | McCarty et al. | |
| 4,873,479 A | 10/1989 | Iimura et al. | |
| 5,117,172 A | 5/1992 | Chen | |
| 5,144,217 A | 9/1992 | Gardner et al. | |
| 5,187,422 A | 2/1993 | Izenbaard et al. | |
| 5,218,284 A | 6/1993 | Burns et al. | |
| 5,256,955 A | 10/1993 | Tomura et al. | |
| 5,349,281 A | 9/1994 | Bugaj | |

(Continued)

OTHER PUBLICATIONS

Energizer, Energizer CH15MN Battery Charger, Product Datasheet, Form No. EBC-6615A, at least as early at Dec. 8, 2009.

(Continued)

*Primary Examiner* — Samuel Berhanu
(74) *Attorney, Agent, or Firm* — Michael Best & Friedrich LLP

(57) ABSTRACT

An energy-efficient and compact multi-port battery charger. The battery charger includes, among other things, a power supply module, a battery charger control module or controller, a power switching module, one or more power control safety modules, a plurality of battery charger switches, and a plurality of indicators. The controller, the power switching module, the power control safety modules, and the battery charger switches work in conjunction with each other to control the operation of the battery charger. The controller is configured to execute a charging control process which detects the insertion of a battery pack into a charging port, selects a charging port for charging, controls the power output from the power switching module, and controls the illumination or display of the indicators. The power switching module uses control signals from the controller to switch the power received from the power supply module such that a charging current is applied to a single charging port. Each of the power control safety modules includes a power control safety circuit that is configured to prevent the charging current and/or the charging voltage from damaging the battery charger or battery pack during a malfunction.

30 Claims, 10 Drawing Sheets

U.S. PATENT DOCUMENTS

| | | | |
|---|---|---|---|
| 5,391,972 | A | 2/1995 | Gardner et al. |
| 5,473,242 | A | 12/1995 | McKenna |
| 5,666,040 | A | 9/1997 | Bourbeau |
| 5,694,025 | A | 12/1997 | Oglesbee et al. |
| 5,734,253 | A | 3/1998 | Brake et al. |
| 5,780,991 | A * | 7/1998 | Brake et al. ............. 320/112 |
| 5,818,197 | A | 10/1998 | Miller et al. |
| 5,831,414 | A | 11/1998 | Yokota et al. |
| 5,900,719 | A | 5/1999 | Iimura |
| 6,018,227 | A * | 1/2000 | Kumar et al. ............. 320/106 |
| 6,097,174 | A | 8/2000 | Yang et al. |
| 6,137,260 | A | 10/2000 | Wung et al. |
| 6,184,655 | B1 | 2/2001 | Malackowski |
| 6,194,867 | B1 | 2/2001 | Cummings et al. |
| 6,399,906 | B1 | 6/2002 | Sato et al. |
| 6,597,152 | B1 * | 7/2003 | Jacobs et al. ............. 320/113 |
| 6,610,941 | B2 | 8/2003 | Pfeiffer |
| 6,646,417 | B2 | 11/2003 | Sato et al. |
| 6,710,577 | B1 | 3/2004 | Shum |
| 6,794,851 | B2 | 9/2004 | Murakami et al. |
| 6,869,299 | B2 | 3/2005 | Tanaka et al. |
| 6,924,625 | B2 | 8/2005 | Teraoka et al. |
| 7,005,831 | B2 | 2/2006 | Watson et al. |
| 7,029,287 | B2 | 4/2006 | Matsunaga et al. |
| 7,064,521 | B2 | 6/2006 | Stanesti et al. |
| 7,262,580 | B2 | 8/2007 | Meyer et al. |
| 7,321,219 | B2 | 1/2008 | Meyer et al. |
| 7,345,455 | B2 | 3/2008 | Jones |
| 7,364,456 | B2 | 4/2008 | Yeh et al. |
| 7,388,352 | B2 | 6/2008 | Bayne et al. |
| 7,405,536 | B2 | 7/2008 | Watts |
| 7,456,614 | B2 | 11/2008 | Sato et al. |
| 7,501,795 | B2 | 3/2009 | Bertness et al. |
| 7,504,804 | B2 | 3/2009 | Johnson et al. |
| 7,508,167 | B2 | 3/2009 | Meyer et al. |
| 7,560,829 | B2 | 7/2009 | Proefrock et al. |
| 7,570,014 | B2 | 8/2009 | Teraoka |
| 2005/0007070 | A1 | 1/2005 | Webb et al. |
| 2005/0024011 | A1 | 2/2005 | Chen |
| 2007/0069688 | A1 * | 3/2007 | Satsuma ............. 320/110 |
| 2007/0069689 | A1 | 3/2007 | Shum |
| 2007/0290653 | A1 * | 12/2007 | Ibrahim ............. 320/107 |
| 2008/0067975 | A1 | 3/2008 | Law |
| 2008/0150480 | A1 | 6/2008 | Navid |
| 2008/0174269 | A1 | 7/2008 | DeRome et al. |
| 2009/0108806 | A1 | 4/2009 | Takano et al. |

OTHER PUBLICATIONS

Black & Decker, 40 Amp Smart Fully Automatic Battery Charger Instruction Manual, Catalog No. BC40EB, Form No. 90516444, printed in China, May 2007.

Black & Decker, Charger and Storage Stations Instruction Manual, Catalog No. CCC3000, Form No. 598014-01, printed in China, Jan. 2004.

Old Contact Terminals for Single Port Charger, photo, at least as early as Nov. 2003.

Craftsman, 3/8 in. 14.4 Volt Cordless Right Angle Drill-Driver Operator's Manual, Variable Speed/Reversible, Model No. 315.101531, Nov. 2003.

* cited by examiner

BATTERY CHARGER

RELATED APPLICATIONS

This application claims the benefit of previously-filed U.S. Provisional Patent Application Ser. No. 61/095,033, filed Sep. 8, 2008, U.S. Provisional Patent Application Ser. No. 61/097,004, filed Sep. 15, 2008, and U.S. Provisional Patent Application Ser. No. 61/121,424, filed Dec. 10, 2008, the entire contents of all of which are hereby incorporated by reference.

BACKGROUND

Multi-port battery chargers allow a user to charge a number of battery packs without having to regularly extract a charged battery pack and insert a depleted battery pack from, for example, a single port charger. For this and other reasons, multi-port battery chargers may be preferred over single port battery chargers, especially by users that use multiple tools or systems of tools with regularity. Although multi-port battery chargers are advantageous in such instances, multi-port battery chargers have drawbacks, such as size, energy inefficiency, and the potential for short-circuited charging ports.

For example, conventional multi-port battery chargers require a separate power supply for each charging port. Although these battery chargers are capable of charging one or more battery packs, requiring a separate power supply makes the battery charger physically cumbersome. Also, a separate power supply for each charging port reduces the efficiency of the battery charger due to the hardware and power required to operate multiple power supplies.

Also, switching circuits used by conventional multi-port battery chargers use, for example, relays or transistors. These switching circuits are susceptible to malfunction (e.g., a short circuit), which may be a safety concern when the switching circuit is being used to control power distribution (e.g., voltage and current distribution) to an electronic load.

The operation and efficiency of multi-port battery chargers are also hindered by devices and techniques for detecting the presence of a battery pack in one of the charging ports. For example, multi-port battery chargers often use a control circuit that monitors the voltages of a pair of charging port power supply terminals. The charging port power supply terminals are continuously powered, and the power supply voltage must be greater than the voltage of the inserted battery pack for the battery charger to detect and charge the battery pack. When a battery pack is inserted, the voltage at the power supply terminals is reduced, and the control circuit determines that a battery pack has been inserted. However, an empty battery charger (e.g., a battery charger with no battery packs inserted for charging) using this technique for battery pack detection remains in a detection mode for days, weeks, or longer, with the charging port power supply terminals being continuously powered.

Alternatively, a battery charger power supply is operated in a low-voltage state and periodically switches the battery charger power supply to a high-voltage state to provide the voltage necessary to check power terminal voltages and determine if a battery pack is inserted. While periodically switching from a low-voltage state to a high-voltage state to check for the presence of a battery pack uses less energy than the above-described technique, this alternative technique makes the battery charger susceptible to long waiting periods during which the battery charger is constantly checking for the insertion of a battery pack.

Additionally, although snap switches such as those available off-the-shelf have been used to detect the insertion of a battery pack into a battery charger, each snap switch requires multiple wires to connect to a printed circuit board ("PCB"). The additional wires make assembling the multi-port battery chargers difficult, and the wires may become tangled or get pinched. The snap switches are also susceptible to inadvertent depression by a user or object. Inadvertent depression of the snap switch causes the control circuit to determine that a battery pack has been inserted, and also causes an erroneous charging current to be supplied to a charging port.

SUMMARY

Embodiments of the invention provide a multi-port battery charger having, for example, six, four, or two charging ports. The battery charger includes, among other things, a power supply module, a battery charger control module or controller, a power switching module, one or more power control safety modules, a plurality of battery pack detection devices or battery charger switches, and a plurality of indicators. The power supply module is electrically connected to a power source, such as a 120V AC power source. The power supply module includes circuitry for regulating power from the power source and distributing power from the power source to other components or modules within the battery charger, such as the controller, the power switching module, and the like.

The battery charger controller is configured to execute a charging control process which is used to determine, for example, whether a battery pack has been inserted into a charging port of the battery charger, and a type of charge required by the battery pack. In one particular embodiment of the charging process, the controller cycles through each of the multiple charging ports to determine which, if any, of the charging ports includes a battery pack that requires a fast charge. If the controller determines that a charging port includes a battery pack that requires fast-charging, the power switching module switches power from the power supply such that a charging current is applied to a single battery pack. If the controller determines that no battery packs are inserted into the battery charger or that no battery packs inserted into the battery charger require a fast charge, the battery charger enters a low-power mode in which power is removed from each of the charging ports and the indicators (e.g., a liquid crystal display or light emitting diode(s)) to reduce the power required by the battery charger. If the battery charger has already fast-charged each of the battery packs inserted into the battery charger, and no new battery packs have been inserted into a charging port, the battery charger supplies each inserted battery pack with a trickle charge for a predetermined period of time.

Each power control safety module includes a protection module or power control safety circuit that is configured to prevent damage to battery packs and/or the battery charger during a malfunction (e.g., a short circuit). The power control safety circuit includes a plurality of electrical components including, e.g., resistors, capacitors, metal-oxide-semiconductor field-effect transistors ("MOSFETs") (e.g., P-type MOSFETS and N-type MOSFETS), and diodes. The MOSFETs are configured as switches which control the flow of current through the power control safety circuit. During normal operation of the battery charger (e.g., when no malfunctions have occurred), the controller provides a charging signal to the power control safety circuit. In response to the charging signal, the plurality of MOSFETS are turned to an "on" state and allow the charging current to charge a battery pack coupled to a charging port of the battery charger. A malfunction occurs, for example, when one of the MOSFET switches is short circuited and no charging signal is being supplied by the controller.

In one embodiment of the power control safety modules, if one or more of the battery charger's charging ports is malfunctioning, the power control safety circuit protects the batteries and/or battery charger from being damaged without rendering the remaining functional charging ports inoperable. For example, the power control safety circuit is configured to monitor the voltage of a predetermined node. If a voltage is detected at the node, a MOSFET is turned to the "on" state, and current flows through a control resistor. The control resistor is adjacent to and thermally coupled with a thermal fuse. A majority of the charging voltage is dissipated by the control resistor, which causes the control resistor to produce a substantial amount of heat in a short period of time. The heat generated by the control resistor is sufficient to open circuit (e.g., blow) the thermal fuse and prevent the charging current from reaching the battery pack.

The charging control process and the power control safety modules are each dependent on an accurate and reliable detection of the presence of a battery pack in a charging port. The battery charger switches are configured to indicate to the controller whether a battery pack has been inserted into a charging port. For example, in some embodiments, two or three clips are used to secure a battery pack to a battery charger. The clips contact the positive and negative battery charging terminals of the battery pack, and provide a path for the charging current from the battery charger to the battery pack. The battery charger switches replace the clip that contacts the negative terminal of the battery pack.

In one particular embodiment of the battery charger switches, the switches include a first flexibly formed part, a second flexibly formed part, and an insulating part. The first flexibly formed part is coupled to the negative terminal of the battery charger power supply module, and the second flexibly formed part is coupled to the controller and is powered at a standard operating voltage (e.g., 5.0V or 3.3V). When a battery pack is inserted into a charging port, the first flexibly formed part is bent inward until it contacts the second flexibly formed part. The voltage of the second flexibly formed part then drops from the standard operating voltage to the power supply negative terminal voltage (e.g., 0V or ground). When the second flexibly formed part of the switch drops to 0V, the controller determines that a battery pack has been inserted into the battery charger, and the battery charging current is able to be initiated. As a consequence of the controller directly detecting the insertion of a battery pack, the battery charger power supply module is maintained indefinitely at a low voltage waiting for the switch to be closed. Therefore, the standby power required to operate the battery charger is minimized, and the battery charger is able to meet government efficiency standards.

In another embodiment of the battery charger switches, the switches include a first fixed conductive component, a second fixed conductive component, an insulating part, and a first distance or gap between the first fixed conductive component and the second fixed conductive component. The first fixed conductive component is electrically coupled to the negative terminal of the battery charger power supply, and the second flexibly formed part is coupled to the controller and is powered (e.g., via a pull-up resistor) at a standard operating voltage (e.g., 5.0 V or 3.3V). When a battery pack is inserted, the negative terminal of the battery pack bridges the first distance between the first fixed conductive component and the second fixed conductive component. The voltage of the second fixed conductive component drops from the standard operating voltage to the power supply negative terminal voltage (e.g., 0V or ground). When the second fixed conductive component of the switch drops to 0V, the controller determines that a battery pack has been inserted into the battery charger, and the battery charging current is initiated.

Additionally, the battery charger is operable to charge any of a plurality of different types of batteries or battery packs. For example, the battery charger is capable of charging battery packs having any number of different voltage ratings, capacity ratings, configurations, shapes, and sizes. Such battery packs include those that are attachable to and detachable from electrical devices such as power tools, test and measurement equipment, vacuum cleaners, outdoor power equipment, and vehicles. Power tools include, for example, drills, circular saws, jig saws, band saws, reciprocating saws, screw drivers, angle grinders, straight grinders, hammers, impact wrenches, angle drills, inspection cameras, and the like. Test and measurement equipment includes digital multimeters, clamp meters, fork meters, wall scanners, IR temperature guns, and the like. Vacuum cleaners include stick vacuums, hand vacuums, upright vacuums, carpet cleaners, hard-surface cleaners, canister vacuums, broom vacuums, and the like. Outdoor power equipment includes blowers, chain saws, edgers, hedge trimmers, lawn mowers, trimmers, and the like.

In one embodiment, the invention provides a battery charger that is configured to connect to and charge a battery pack for any of a plurality of electrical devices. The battery charger includes a housing, a power supply module, a controller, at least one protection circuit, and a battery pack detection device. The housing includes a plurality of charging ports, and each of the plurality of charging ports is configured to receive a battery pack. The power supply module is electrically connected to a power source and is configured to distribute power to the battery charger. The battery charger includes a normal operational power mode and a low operational power mode. The controller is configured to determine whether any of the plurality of charging ports is to receive a first charging current, determine whether any of the plurality of charging ports is to receive a second charging current, and operate the battery charger in the normal operational power mode when one or more of the plurality of charging ports is to receive the first charging current or the second charging current. The at least one protection circuit includes at least one semiconductor switch configured to prevent a charging current from being supplied to a charging port when a defect condition related to the charging port is detected. The battery pack detection device is positioned within at least one of the plurality of charging ports and is electrically connected to the controller. The battery pack detection device is configured to provide an indication to the controller of the presence of a battery pack in the at least one of the plurality of charging ports, and provides an electrical connection between the at least one of the plurality of charging ports and the battery pack.

In another embodiment, the invention provides a battery charger that is configured to connect to and charge a battery pack for any of a plurality of electrical devices. The battery charger includes a housing, a power supply module, a controller, at least one protection circuit, and a battery pack detection device. The housing includes one or more charging ports, and each of the one or more charging ports is configured to receive a battery pack. The power supply module is electrically connected to a power source and is configured to distribute power to the battery charger. The controller is configured to receive an indication of a presence of a battery pack in one of the plurality of charging ports. The at least one protection circuit includes at least one semiconductor switch that is configured to prevent a charging current from being supplied to a charging port when a defect condition related to the charging port is detected. The battery pack detection device is positioned within at least one of the one or more charging ports, and is electrically connected to the controller. The battery pack detection device includes a first conductive part, a second conductive part, a first terminal, and a second terminal. A voltage of the first terminal is a battery charger reference voltage, a voltage of the second terminal is a battery charger control voltage, and the first conductive part and the second conductive part are brought into electrical connection with one another when a battery pack is inserted into the at least one of the one or more charging ports. The voltage of the second terminal is reduced from the battery charger control voltage to the battery charger reference voltage after being brought into electrical connection with the first terminal.

In yet another embodiment, the invention provides a battery charger that is configured to connect to and charge a battery pack for any of a plurality of electrical devices. The battery charger includes a housing, a power supply module, a controller, and at least one protection circuit. The housing includes a plurality of charging ports, and each of the plurality of charging ports is configured to receive a battery pack. The power supply module is electrically connected to a power source and is configured to distribute power to the battery charger. The controller is configured to select one of the plurality of charging ports that is to receive a charging current, and generate a charging signal to enable the selected one of the plurality of charging ports to receive the charging current. The at least one protection circuit is configured to receive the charging signal from the controller when the at least one protection circuit is in a normal operational mode. The at least one protection circuit includes a first semiconductor switch and a second semiconductor switch. The first semiconductor switch allows the charging current to be supplied to the at least one of the plurality of charging ports when the at least one protection circuit is receiving the charging signal from the controller, and the second semiconductor device prevents the charging current from being supplied to the at the least one of the plurality of charging ports when the at least one protection circuit is not receiving the charging signal from the controller.

In one particular embodiment, the invention provides a battery charger that is configured to connect to and charge a battery pack for any of a plurality of electrical devices. The battery charger includes a housing, a power supply module, and a controller. The housing includes a plurality of charging ports, and each of the plurality of charging ports is configured to receive a battery pack. The power supply module is electrically connected to a power source and is configured to distribute power to the battery charger. The battery charger includes a first operational power mode and a second operational power mode. The controller is configured to execute a charging control process that includes detecting an indication related to a presence of a battery pack in one of the plurality of charging ports, determining whether any of the plurality of charging ports is to receive a first charging current, determining whether any of the plurality of charging ports is to receive a second charging current, and operating the battery charger in the first operational power mode when at least one of the plurality of charging ports is to receive the first charging current or the second charging current. The first charging current is greater than the second charging current. The charging control process also includes generating a charging signal to enable one of the plurality of charging ports to receive the first charging current or the second charging current when the one of the plurality of charging ports is to receive the first charging current or the second charging current, and operating the battery charger in the second operational power mode when none of the plurality of charging ports is to receive the first charging current or the second charging current.

In another particular embodiment, the invention provides a battery charger that is configured to connect to and charge a battery pack for any of a plurality of electrical devices. The battery charger includes a housing, a power supply module, a controller, and a battery pack detection device. The housing includes one or more charging ports, and each of the one or more charging ports is configured to receive a battery pack. The power supply module is electrically connected to a power source and is configured to distribute power to the battery charger. The controller is configured to receive an indication of a presence of a battery pack in one of the plurality of charging ports, select one of the plurality of charging ports that is to receive a charging current, and generate a charging signal to enable the selected one of the plurality of charging ports to receive the charging current. The battery pack detection device is positioned within at least one of the one or more charging ports and is electrically connected to the controller. The battery pack detection device includes a first conductive part coupled to a negative terminal of the power supply module, a second conductive part coupled to the controller and powered at a control voltage, and an insulating part that electrically insulates the first conductive part from the second conductive part. The first conductive part is bent toward the second conductive part when a battery pack is inserted into the at least one of the one or more charging ports.

In another embodiment, the invention provides a battery charger that is configured to connect to and charge a battery pack for any of a plurality of electrical devices. The battery charger includes a housing, a power supply module, a controller, and a battery pack detection device. The housing includes one or more charging ports, and each of the one or more charging ports is configured to receive a battery pack. The power supply module is electrically connected to a power source, and is configured to distribute power to the battery charger. The controller is configured to receive an indication of a presence of a battery pack in one of the plurality of charging ports, select one of the plurality of charging ports that is to receive a charging current, and generate a charging signal to enable the selected one of the plurality of charging ports to receive the charging current. The battery pack detection device is positioned within at least one of the one or more charging ports and is electrically connected to the controller. The battery pack detection device includes a first conductive part that is coupled to a negative terminal of the power supply module, and a second conductive part that is coupled to the controller and is powered at a control voltage. The first conductive part and the second conductive part are separated from one another by a fixed distance, and an insulating part electrically insulates the first conductive part from the second conductive part. The distance between the first conductive part and the second conductive part is bridged by a terminal of a battery pack when the battery pack is inserted into the at least one of the one or more charging ports.

Other aspects of the invention will become apparent by consideration of the detailed description and accompanying drawings.

DETAILED DESCRIPTION

Figure 1:
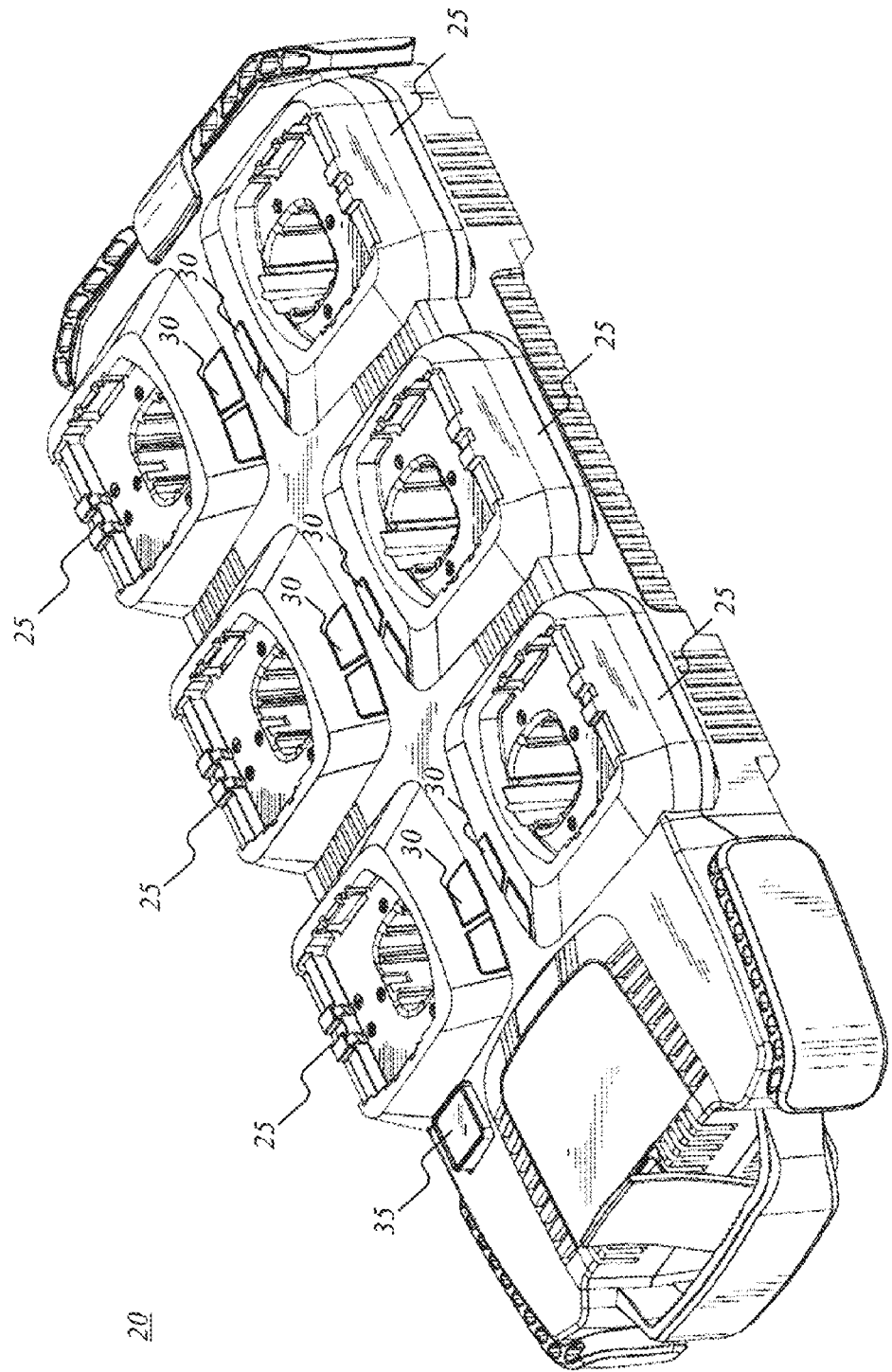
FIG. 1 illustrates a multi-port battery charger according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to an energy-efficient and compact multi-port battery charger. The battery charger includes, among other things, a power supply module, a battery pack control module or controller, a power switching module, one or more power control safety modules, a plurality of battery pack detection devices or battery charger switches, and a plurality of indicators. The power supply module is electrically connected to a power source, such as a 120V AC or 240V AC power source. The power supply includes circuitry for regulating power from the power source and distributing power from the power source to other components or modules within the battery charger. The controller, the power switching module, the power control safety modules, and the battery charger switches work in conjunction with each other to control the operation of the battery charger. For example, the controller is configured to execute a charging control process using corresponding circuitry which determines, among other things, whether a battery pack has been inserted into a charging port of the battery charger, and a type of charge required by the battery pack. The controller also detects the presence of a battery pack in a charging port, selects a charging port for charging, controls the power output from the power switching module, and controls the illumination or display of the indicators. The power switching module uses control signals from the controller to switch power received from the power supply module such that a charging current is applied to a single charging port or battery pack. Each of the power control safety modules includes a power control safety or protection circuit that is configured to prevent the charging current and/or the charging voltage from damaging the battery charger or battery pack when the charging circuit malfunctions.

The battery charger is operable to charge any of a plurality of different types of batteries or battery packs. For example, the battery charger is capable of charging battery packs having nickel-metal hydride ("NiMH"), nickel-cadmium ("NiCd"), lithium-cobalt ("Li—Co"), lithium-manganese ("Li—Mn"), Li—Mn spinel, or other suitable lithium or lithium-based chemistries. In some embodiments, the battery charger makes a determination of the type of battery pack inserted into the battery charger based on, for example, a terminal voltage. In other embodiments, the battery charger receives information or a signal from a battery pack which indicates a battery pack type. The battery charger is also operable to receive and charge battery packs having any number of different voltage ratings, capacity ratings, configurations, shapes and sizes. For example, the battery charger is operable to charge battery packs having voltage ratings of 4V, 8V, 12V, 16V, 18V, 20V, 24V, 48V, etc., or battery packs having any voltage rating therebetween. The battery charger is also operable to charge battery packs having individual cells with capacity ratings of 1.2 Ah, 1.3 Ah, 1.4 Ah, 2.0 Ah, 2.4 Ah, 2.6 Ah, 3.0 Ah, etc. The individual cell capacity ratings are combined to produce a total battery pack capacity rating, which is based both on the capacity ratings of the individual cells and the number of cells in each battery pack. The configurations, shapes, and sizes of the battery packs include but are not limited to the configurations, shapes, and sizes of battery packs that are attachable to and detachable from electrical devices such as power tools, test and measurement equipment, vacuum cleaners, outdoor power equipment, and vehicles.

FIG. 1 illustrates a battery charger 20 that includes six charging ports 25 for receiving a plurality of batteries or battery packs, and providing a charging current to the battery packs. Each charging port 25 also includes at least one indicator 30 which provides a user with an indication of the state of the charging ports 25 and the battery packs. In one embodiment, each charging port 25 includes a red light emitting diode ("LED") and a green LED to indicate to a user the level of charge of the battery pack, or that a malfunction or defect exists in a battery pack or a charging port 25. The indicators are lighted, for example, in a "solid-on" state or a "flashing" state. The battery charger 20 also includes one or more indicators 35 to provide feedback to the user related to the state of the battery charger 20.

In one embodiment, the indicators 30 and 35 are activated in the solid-on state when the battery charger 20 is operating at full power, providing a charging current, or both. In another embodiment, the indicator 35 is in an illuminated state for a first period of time and a non-illuminated state for a second period of time. For example, the indicator 35 is in the illuminated state for approximately 0.25 seconds and in the non-illuminated state for approximately 2.5 seconds to indicate that the battery charger 20 is providing a maintenance charge to a charging port 25. In some embodiments, the indicator 35 is faded up and down when the battery charger 20 is in a low-power operational mode or energy save mode. In other embodiments, the indicator 35 is faded up and down and flashed (e.g., three short flashes) to indicate that the battery charger 20 is in an energy save mode and one or more of the charging ports 25 or battery packs is defective.

Figure 2:
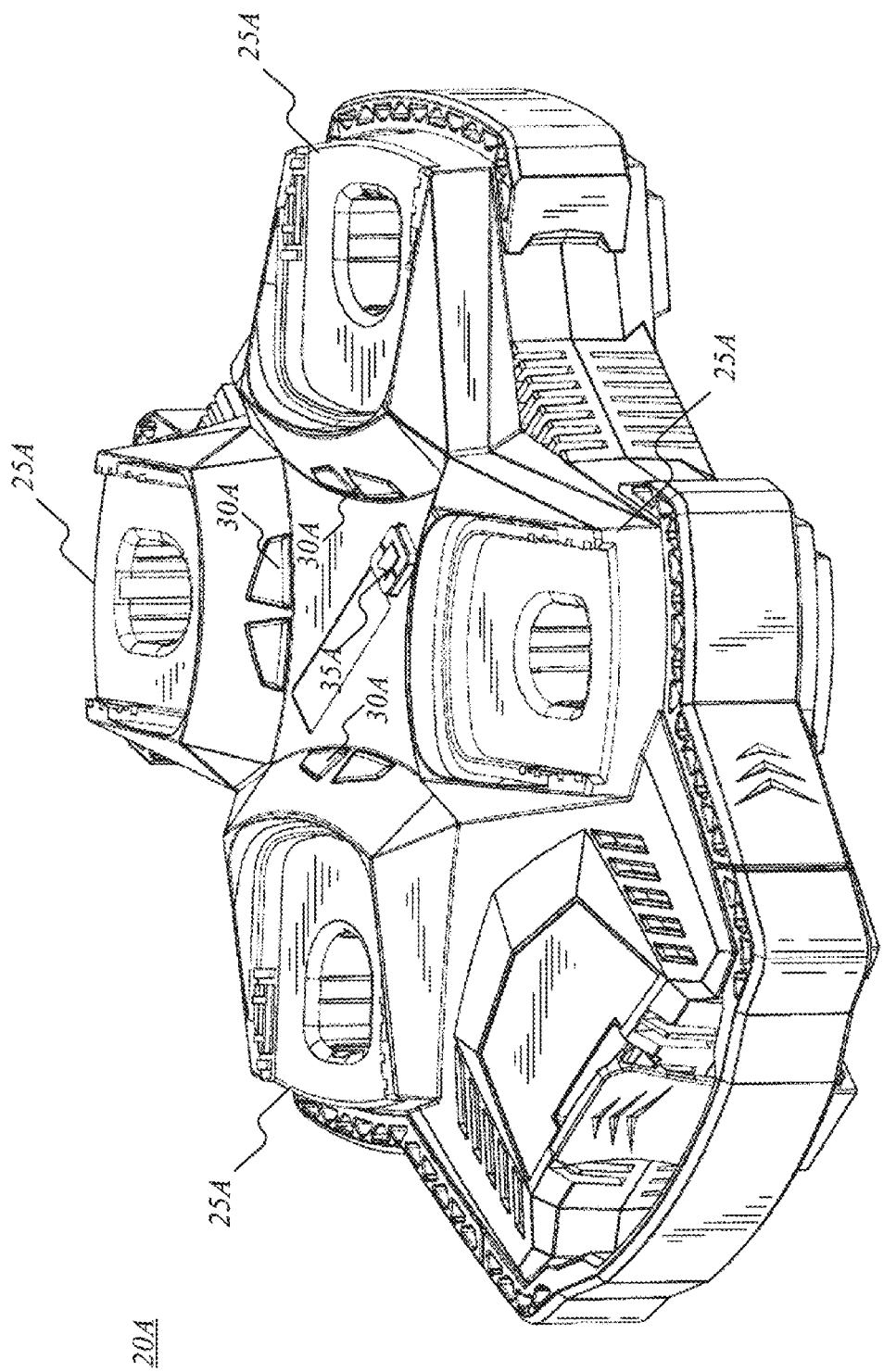
FIG. 2 illustrates a multi-port battery charger according to another embodiment of the invention.

FIG. 2 illustrates a battery charger 20A that includes four charging ports 25A for receiving a plurality of batteries or battery packs, and providing a charging current to the battery packs. The battery charger 20A is similar in operation to the battery charger 20 illustrated in FIG. 1, and like features are identified with corresponding reference numerals. The differences between the six-port battery charger 20 and the four-port battery charger 20A are described with respect to various embodiments of the invention. In other embodiments, the battery charger has, for example, two charging ports.

Figure 3:
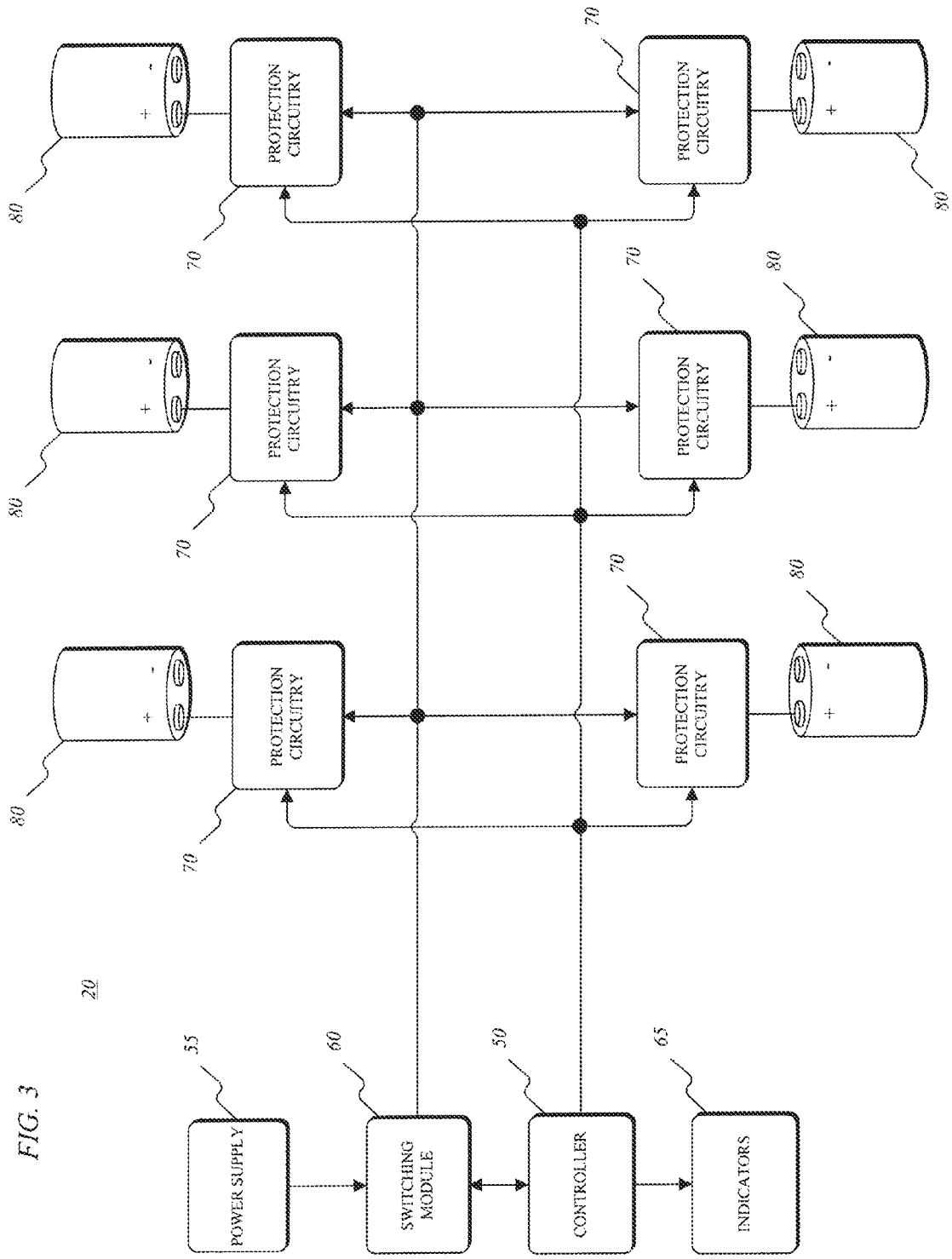
FIG. 3 is a diagram of the multi-port battery charger of FIG. 1.

FIG. 3 is a block diagram of the battery charger 20 of FIG. 1. The battery charger 20 includes a battery charger controller 50, a power supply module 55, a power switching module 60, a plurality of indicators 65, and a plurality of protection modules or circuits 70. The controller 50 includes software and hardware that is operable to, among other things, control the battery charger 20, provide protection (e.g., over-voltage protection) to the battery charger 20, control charging voltage and charging current from the battery charger 20, send information to a battery pack, activate the plurality of indicators (e.g., LEDs or a liquid crystal display ("LCD")), and monitor the temperature of the battery pack 80. In one embodiment, the controller 50 includes a printed circuit board ("PCB") (not shown) that is populated with a plurality of electrical and electronic components which provide the operational control and protection to the battery charger 20. In some embodiments, the PCB includes a control or processing unit such as a microprocessor, a microcontroller, or the like. In some embodiments, the controller 50 includes the processing unit, a memory, and a bus. The bus connects various components of the controller 50 including the memory to the processing unit. The memory includes, in many instances, read only memory ("ROM") such as an electrically erasable programmable read-only memory ("EEPROM") and random access memory ("RAM"). The controller 50 also includes an input/output system that includes routines for transferring information between components within the controller 50 and other components of the battery charger 20. Software included in the implementation of the battery charger 20 is stored in the memory of the controller 50. The software includes firmware applications and other executable instructions. For example, the controller 50 is configured to execute, among other things, a battery pack charging control process such as the charging control process described below with respect to FIGS. 4-6. In other embodiments, the controller 50 includes additional, fewer, or different components.

The PCB also includes, among other things, a plurality of additional passive and active components such as resistors, capacitors, inductors, integrated circuits, and amplifiers. These components are arranged and connected to provide a plurality of electrical functions to the PCB including, among other things, filtering, signal conditioning, and voltage regulation. For descriptive purposes, the PCB and the electrical components populated on the PCB are collectively referred to herein as "the controller" 50. The controller 50 also receives signals from the components or modules within the battery charger 20, conditions and processes the signals, and transmits processed and conditioned signals to, for example, the power switching module 60 or indicators 65.

With continued reference to FIGS. 1 and 3, the battery charger 20 is configured to charge one of the plurality of battery packs 80 at a time, and each charging port 25 is assigned a charging port number. For example, the charging ports 25 are assigned letters or numbers, such as #1-#6. Similar numerical or alpha-numerical designations are made for a four-port battery charger and a two-port battery charger. When a battery pack 80 is inserted into a charging port 25 of the battery charger 20, the battery charger 20 cycles serially through the charging ports 25 to determine if any of the battery packs 80 which are inserted into the charging ports 25 of the battery charger 20 require a fast charge (e.g., a charge from 0% capacity to 95% capacity). The battery charger 20 cycles through the charging ports 25 beginning with charging port #1 and ending with charging port #6. For example, if a battery pack 80 is inserted into charging port #4, the battery charger 20 cycles through the charging ports 25 beginning with charging port #1 and proceeding to charging port #6. If the battery charger 20 determines that a battery pack 80 requires fast charging, the battery charger 20 discontinues cycling through the charging ports 25 and charges the battery pack 80 which was identified as requiring fast charging. If the battery charger 20 determines that a battery pack 80 in, for example, charging port #2 requires fast charging, the battery charger 20 charges the battery pack in charging port #2 before the battery pack 80 in charging port #4 (the battery pack 80 most recently inserted into the battery charger 20). When the battery pack 80 in charging port #2 has finished fast charging, the battery charger 20 restarts cycling through the charging ports 25 beginning with charging port #1.

The battery charger 20 determines when a battery pack 80 has been inserted into a charging port 25 using, for example, a switch that detects the insertion of the battery pack 80. After the battery charger 20 determines that a battery pack 80 has been inserted into a charging port 25 and cycles through the charging ports 25 to identify a first battery pack 80 that requires fast charging, power is supplied to the first battery pack 80 through battery protection circuitry 70. Each charging port 25 includes battery protection circuitry 70 that prevents damage to the battery packs 80 and/or the battery charger 20 during a malfunction (e.g., a short circuit). In one embodiment, the battery charger 20 charges an inserted battery pack 80 with a constant charging current of 2 A and negative delta-voltage termination. Negative delta-voltage termination includes storing a battery pack peak voltage in memory, comparing a recent battery pack voltage to the stored peak voltage, and terminating charging when the recent battery pack voltage falls below a threshold value (e.g., 1.0% below the peak voltage). In some embodiments, the battery charger 20 provides a constant charging current of, for example, 2.9 A until the battery pack 80 is nearly fully charged. The charging current is then gradually tapered off (e.g., in a linear manner) to simulate a constant voltage charging mode. In other embodiments, the battery charger 20 charges the battery pack at a current level (e.g., between approximately 0.2 A and approximately 5.0 A) which is requested by the battery pack 80. The charging current is controlled using, for example, pulse width modulation ("PWM") or a pulse width modulator. A PWM signal is generated by the controller 50, and the duty cycle of the PWM signal is operable to control the charging current of the battery charger 20. In some embodiments, the charging currents generated by the battery charger 20 are in the range of 0.1 A to 5.0 A, although charging currents outside of this range are suitable for other embodiments of the invention.

Figure 4:
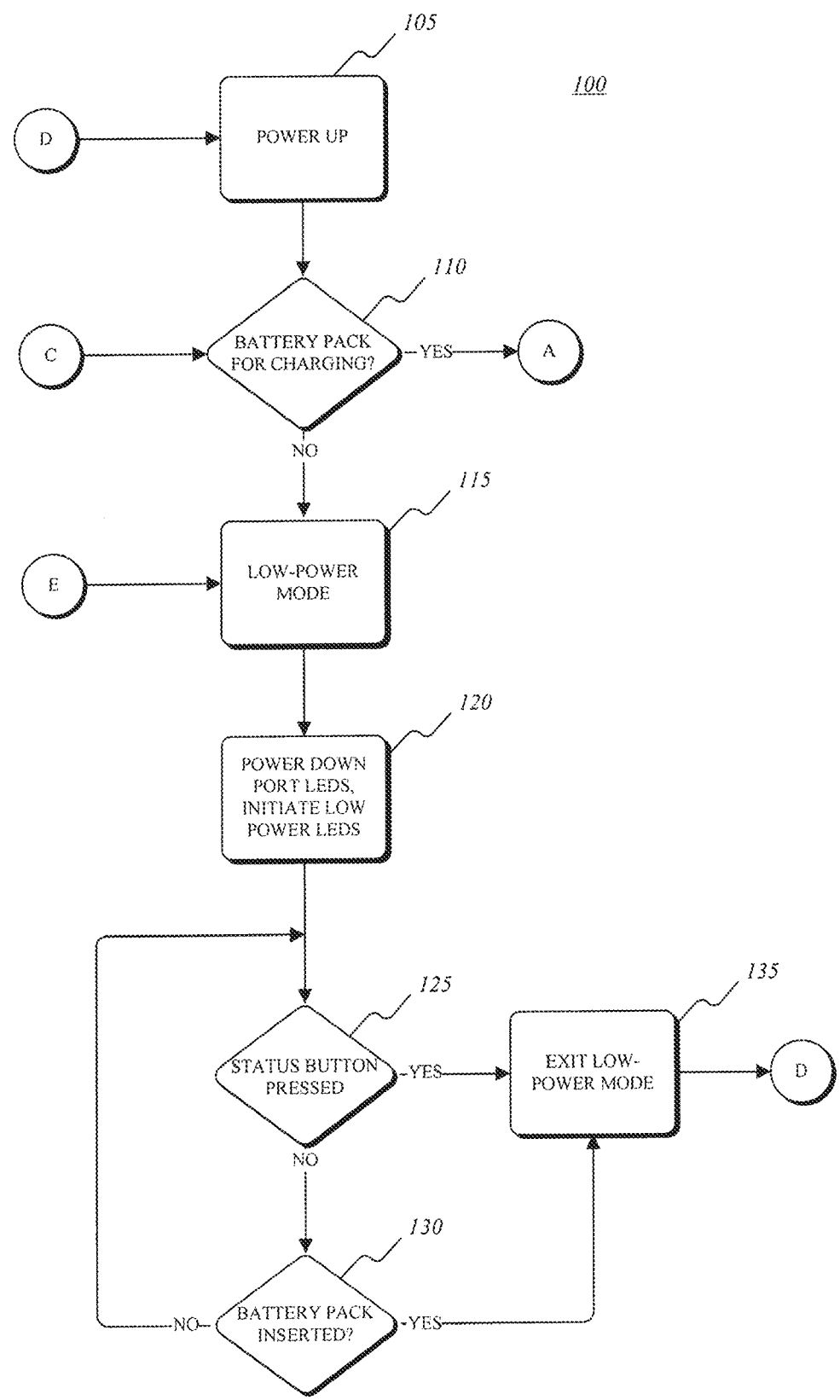
FIGS. 4-6 illustrate a process for controlling the multi-port battery charger of FIG. 1.
Figure 5:
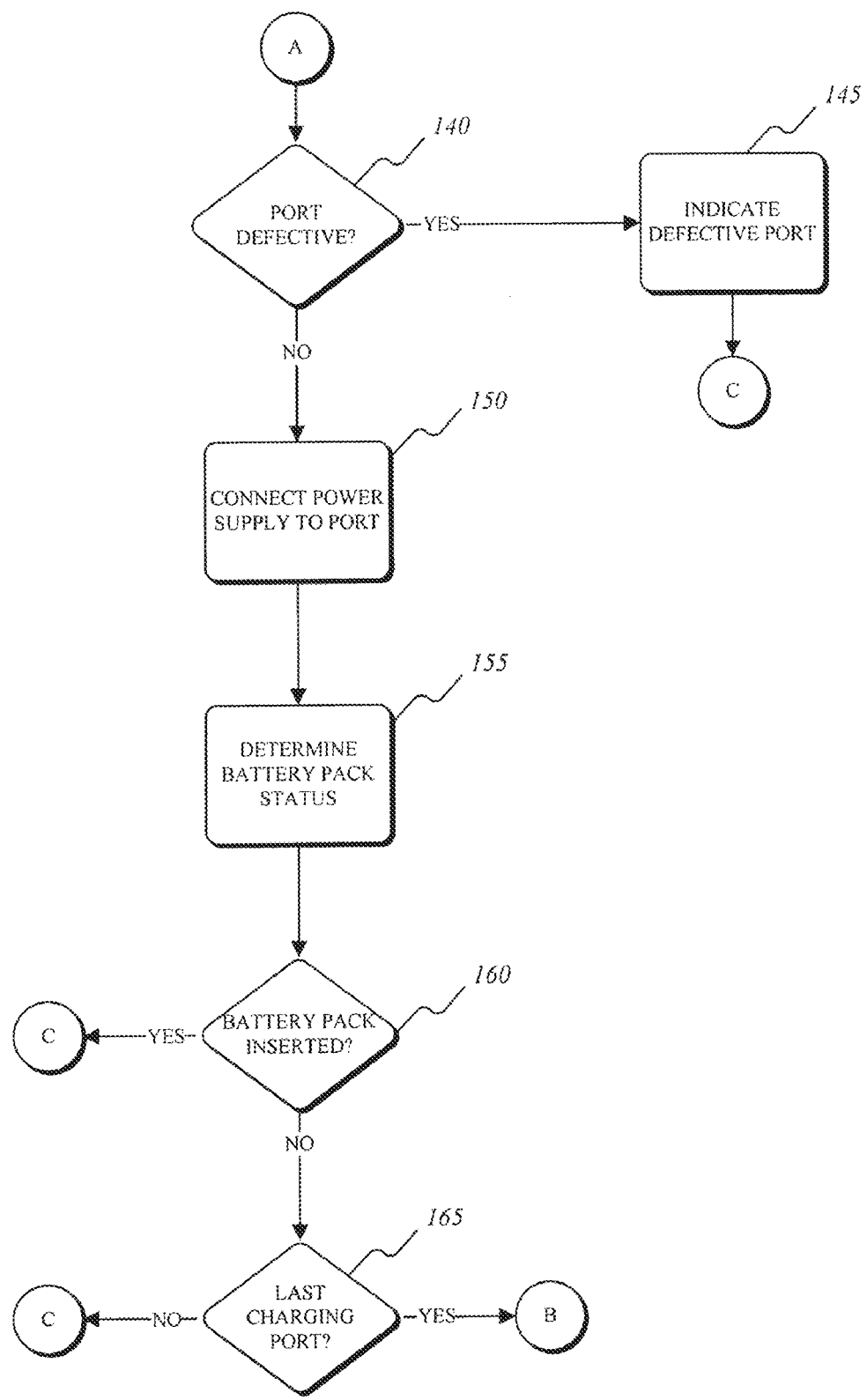
Figure 6:
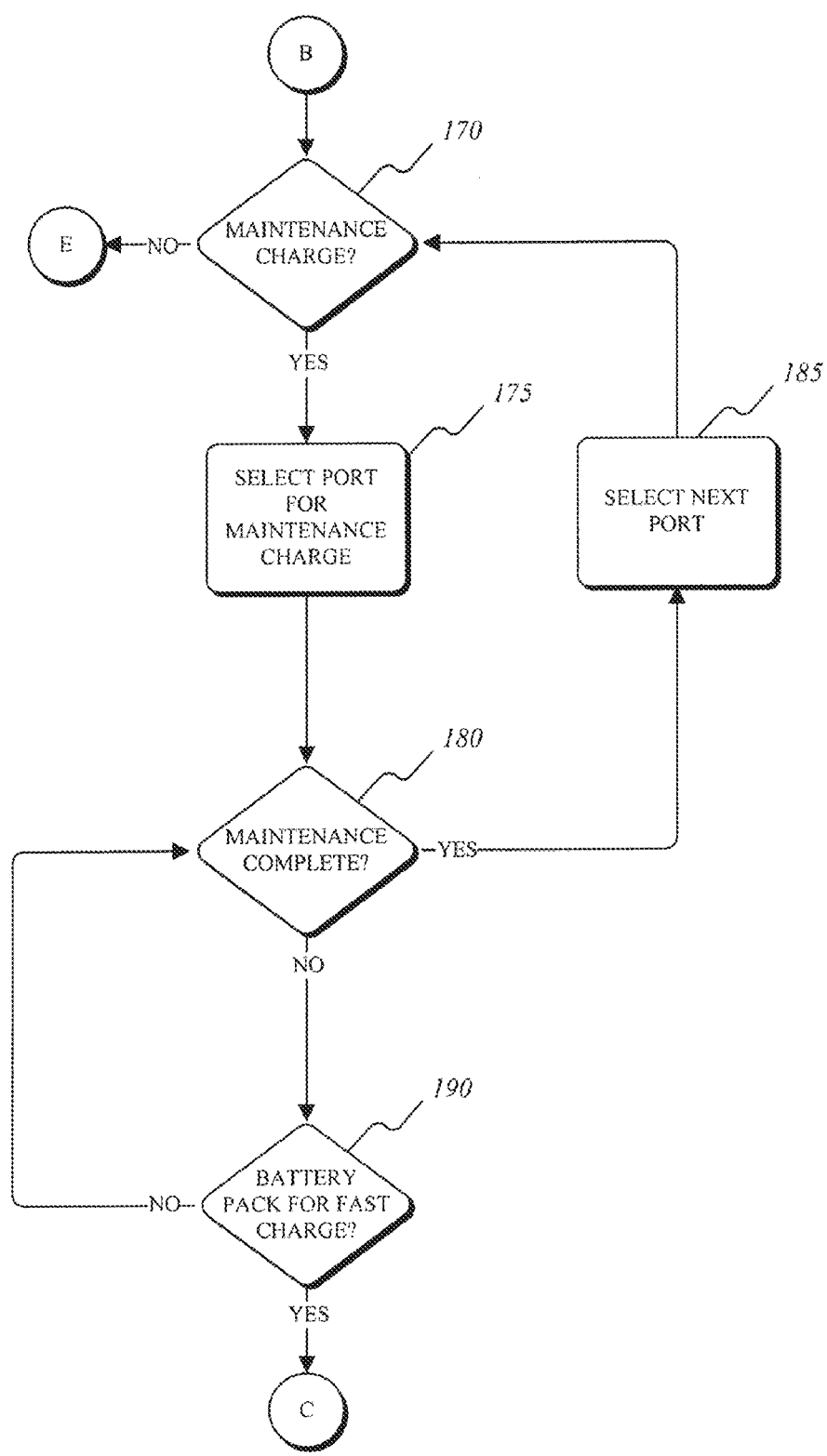

FIGS. 4-6 illustrate a charging control process 100 executed by the controller 50 for controlling the battery charger 20. The battery charger 20 is powered up (step 105) into a normal operational power mode and begins checking for a battery pack that requires charging (step 110). The presence of a battery pack is detected using, for example, the battery charger switches described below with respect to FIGS. 8-10, or other types of switches, such as snap switches or optical beam sensors. When the battery charger 20 is powered up, a power LED or other indication device, such as indicator 35, is activated to indicate to a user that the battery charger 20 is powered. The power LED is in a "constant-on" or "solid-on" state when the battery charger 20 is initially powered up. As described below, the power LED is controlled to provide the user with an indication of the state of the battery charger 20. If the battery charger 20 determines that no battery pack has been inserted, or that no battery packs require fast-charging, the battery charger 20 enters a low energy or low operational power mode (step 115). While in the low-power mode, the battery charger 20 removes power from each charging port and each port LED and begins pulsing the power LED up and down to indicate to the user that the battery charger 20 has entered the low-power mode (step 120). When in the low-power mode, the battery charger 20 determines whether a status switch (e.g., a button) has been activated (step 125). If the status switch has not been activated, the battery charger 20 determines whether a battery pack that requires fast charging has been inserted into a charging port 25 (step 130). The battery charger 20 remains in the low-power mode while determining whether a battery pack has been inserted into a charging port 25. If the battery charger 20 determines that a battery pack has been inserted into a charging port 25, the battery charger 20 exits the low-power mode (step 135) and again cycles through the charging ports as described above. If the battery charger 20 determines that no new battery packs have been inserted into a charging port 25, the battery charger 20 remains in the low-power mode. If the status button has been pressed, the battery charger 20 exits the low-power mode (step 135) and again begins cycling through each of the charging ports 25 (step 110), as described above.

If, at step 110, a battery pack has been inserted into the charger which requires fast charging, the process 100 proceeds to control section A, shown in and described with respect to FIG. 5. The battery charger 20 then determines whether the charging port is defective (e.g., short-circuited, inadvertently closed, etc.) (step 140). If the charging port is determined to be defective (e.g., after a predetermined timeout period), the battery charger 20 provides an indication such as a flashing LED or multiple flashing LEDs to the user to identify the charging port as defective (step 145). A defective charging port is identified by the controller 50, for example, when the power switching module 60 is providing a charging current to a charging port 25 which is not receiving a charging signal from the controller 50, or when a charging port 25 that is receiving a charging signal from the controller 50 is not receiving a charging current from the power switching module 60 (e.g., when a fuse has opened). In some embodiments, the defective port signal continues as long as the battery charger 20 is powered. To reset the error condition, the battery charger 20's power is cycled to reset the controller 50. If, for example, a port FET is shorted, the controller 50 detects the shorted FET and disables the defective port to prevent a battery pack from being charged by the defective port. Additionally or alternatively, if an inserted battery pack is defective, the battery charger 20 provides an indication to a user, such as a flashing LED or multiple flashing LED's. The error condition is then reset once the defective battery pack is removed.

After detecting a defective charging port or battery pack, the battery charger 20 returns to step 110 shown in FIG. 4, and again cycles through the charging ports. In some embodiments, the battery charger 20 is configured to cycle through only the charging ports 25 that are not defective. In other embodiments, the battery charger 20 cycles to the defective charging port (or battery pack) before restarting the cycling at step 110. After the battery charger 20 identifies a charging port that is not defective and includes a first battery pack that requires fast-charging, the power switching module 60 switches power from the power supply module 55 such that a charging current is applied to the charging port 25 to begin charging the first battery pack (step 150). The power switching module 60 switches power from the power supply module 55 such that a charging current is applied to only a single charging port 25. The battery charger 20 determines a status of the first battery pack based on the battery pack voltage and the amount of current supplied to the battery pack (step 155). In some embodiments, the status of the battery pack is, for example, fully charged, defective, deeply discharged, open fuse, open thermostat, etc. When the first battery pack has finished fast-charging, a fast-charge complete flag (described below) for the first battery pack is set by the controller 50.

The status of a battery pack is indicated to a user using a display or other indication devices. The indication devices include a plurality of LEDs, an LCD, or the like. In one embodiment, a red LED is lighted to indicate the presence of a battery pack, and a green LED is lighted to indicate that the battery pack has been fully charged. In another embodiment, a red LED and a green LED flash to indicate a defective battery pack. In other embodiments, additional indicators or indicating methods are used, such as a row of LEDs that indicate the charge level of the battery pack or a linguistic (e.g., verbal or textual) identification of the status of the battery pack.

Following the completion of the fast-charge for the first battery pack, the battery charger 20 determines whether a second battery pack has been inserted into a charging port 25 of the battery charger 20 (step 160). If a second battery pack has been inserted into a charging port 25, the battery charger returns to step 110, shown in FIG. 4, to cycle through the charging ports 25 and determine whether any of the inserted battery packs requires fast-charging. If no new battery packs have been inserted, the battery charger 20 determines whether the battery charger 10 has cycled to the last (e.g., the sixth) charging port 25 (step 165). If the battery charger 20 determines that it has reached the sixth charging port 25 and all battery packs have been fast-charged, the process 100 proceeds to control section B shown in and described with respect to FIG. 6, and determines whether a maintenance charge is needed for each of the inserted battery packs (step 170). If a maintenance charge is required, the battery charger 20 selects the first charging port 25 (in numerical order) that requires the maintenance charge (step 175). The maintenance charge is supplied to a battery pack for a predetermined period of time. In general, the maintenance charge charges the battery packs with a lower charging current than the fast charge. However, in some embodiments, the charging current used during the maintenance charge is equal or nearly equal to the fast charging current, but is supplied to the battery packs for only a short duration of time. In one embodiment, the maintenance charge has a period of 1 hour. In other embodiments, different time periods are used, such as 30 minutes, 2 hours, or a time period based on the voltage of the battery pack. During the maintenance charge, the power LED is set to an intermittent pulsing or flashing to indicate that a battery pack is receiving a maintenance charge. The charging ports are cycled as described above with respect to the fast-charge process. After the battery charger completes the maintenance charge (step 180) on the first battery pack, the battery charger cycles to the next battery pack in the charger (step 185).

While performing the maintenance charge, the battery charger 20 continuously checks for the insertion of a new battery pack (step 190). If a new battery pack is inserted into a charging port 25, the battery charger 20 returns to step 110, shown in FIG. 4, and begins cycling through the charging ports 25 to determine if any of the battery packs inserted into the charging ports 25 require fast-charging. If no new battery pack has been inserted into a charging port 25, and each of the battery packs inserted into charging ports 25 has received a maintenance charge, the battery charger enters the low-power mode (step 115), shown in FIG. 4. In some embodiments, the maintenance charge is only performed once on each battery pack inserted into a charging port 25 of the battery charger 20. In other embodiments, the maintenance charge is performed periodically on each battery pack based on time (e.g., the length of time the battery pack is inserted in a charging port 25) and/or the battery pack's voltage.

A fast-charge complete flag is set in the controller 50 to prevent a battery pack from receiving a fast-charging current repeatedly while inserted in the battery charger 20, and each charging port 25 has an associated fast-charge complete flag. For example, if a battery pack is inserted into the battery charger 20 and receives the fast-charge and the maintenance charge, but the battery pack is left in the charging port 25 for an extended period of time (e.g., 1-5 days), the fast-charge complete flag prevents the battery pack from repeated or continuous fast or maintenance charges. Similarly, if a charging port 25 or battery pack is determined to be defective, the battery charger 20 is prevented from repeatedly and continuously providing charging current to that charging port 25. In one embodiment, a threshold timeout value or timeout period is set (e.g., a 5 day or approximately 7,200 minute timeout). The battery pack does not receive additional fast or maintenance charges until the threshold timeout value is exceeded, and the battery pack is once again treated as a newly inserted battery pack. By preventing a battery pack from receiving unnecessary fast or maintenance charges, the battery charger 20 is able to extend the life of the battery pack. If the battery pack were to continuously receive a charging current (e.g., fast or maintenance) the temperature of the battery pack would remain high for the duration of the time it is inserted in the battery charger 20. A prolonged, increased battery pack temperature shortens the useful life (e.g., number of charges) of the battery before the battery pack becomes defective.

For each fast-charge complete flag, a fast-charge complete flag counter or timer is incremented, for example, once per minute. Upon the counter reaching the threshold timeout value, the fast-charge complete flag is reset, and the battery pack is again able to receive a charging current. Counting to the threshold timeout value is repeated indefinitely as long as the battery charger 20 remains powered and the battery pack is not removed from the charging port 25. In other embodiments of the invention, the fast-charge complete flag is set for different periods of time, such as 1-4 days, or the battery charger 20 is configured to periodically monitor the voltage of the battery pack to determine whether the battery pack has lost a substantial amount of charge (e.g., half of its charge).

If a battery pack has lost a substantial amount of charge, it may indicate that the battery pack is at the end of its useful life, or is defective and requires repair. The battery charger 20 also determines whether the battery pack is at the end of its useful life by monitoring the amount of current supplied to the battery pack after the fast-charge complete flag has been reset. For example, as a battery pack is being fast charged following the fast-charge complete flag counter timeout, the controller monitors the amount of time the fast charging current is supplied to the battery pack. The charging current divided by the length of time the charging current was supplied results in a recharge capacity in amp-hours. The controller 50 also monitors the ambient temperature of the battery pack during the timeout period and calculates an acceptable amount of discharge the battery pack is expected to experience. If the actual discharge is greater than the acceptable amount, or outside of an acceptable range, the battery pack may be defective. Additionally or alternatively, the controller 50 performs the above calculations for two or more timeout periods to determine an average self-discharge for the time period. The average self-discharge is then compared to a known or calculated amount of expected discharge to determine if the battery pack is defective.

In other embodiments, a shorter timeout period (e.g., 1-2 days) is used between the end of fast or maintenance charging. Following the timeout period, the controller 50 monitors the amount of time the fast charging current is supplied to a charging port to calculate a recharge capacity. Based on the recharge capacity, a variable recharge delay is calculated for a charging port 25. The variable recharge delay is set for a charging port 25 until, for example, the battery pack is removed or power to the battery charger is cycled. As a result, a shorter recharge delay time is set for battery packs that are nearing the end of their useful lives, and a longer recharge delay time is set for battery packs that are newer.

In some embodiments of the invention, the battery charger 20 is electrically connectable to multiple input power sources. For example, the battery charger 20 is electrically connectable to a source of AC power, such as an AC wall outlet which provides mains AC power to the battery charger 20, or the battery charger 20 is electrically connectable to a DC power source. DC power sources include, for example, a cigarette lighter, vehicle power outlet, or other 12V DC power sources. Other DC power sources include universal serial bus ("USB") enabled devices such as solar panels, hand cranks, laptop computers, and the like. The battery charger 20 is configured to provide a charging current to one or more battery packs inserted into the battery charger 20 from either the AC or DC power sources. In one embodiment, the battery charger 20 provides a higher charging current to a battery pack when the battery charger 20 is electrically connected or coupled to an AC power source or a higher voltage DC power source (e.g., a 12V or 24V source) than when the battery charger 20 is electrically connected or coupled to a lower voltage DC power source (e.g., a USB device). In such an embodiment, when the battery charger 20 is connected to the higher voltage source, the battery pack is generally charged in the fast or a rapid charge mode unless the pack is receiving a trickle charge, as described above. Alternatively, when the battery charger 20 is connected to a DC power source, the battery pack is charged in a slow charge mode. The charging mode of the battery charger 20 switches between the fast charge mode and the slow charge mode depending on which power source is supplying power to the battery charger. For example, if the battery charger 20 is charging a battery pack in the slow charge mode, and the battery charger 20 is then connected to a higher voltage AC or DC power source, the battery charger 20 switches from the slow charge mode to the fast charge mode. If the battery charger 20 is charging a battery pack in the fast charger mode, and the battery charger 20 is connected to a low power DC source, the battery charger 20 continues to charge the battery pack in the fast charge mode until the battery charger 20 is no longer connected to the higher voltage power source or the battery pack has completed fast charging.

The detection of a defective or malfunctioning charging port 25, such as in step 140 of process 100, is described in greater detail with respect to the protection modules 70. The protection modules 70 detect a component malfunction (e.g., a short circuit, inadvertent closing of a battery charger switch, etc.) based on, for example, a plurality of node voltages. The protection modules 70 described herein are capable of protecting multi-port battery chargers that include a single charging circuit or a plurality of individual charging circuits. The protection modules 70 also prevent the remaining functional charging ports from being rendered inoperable in the event of a malfunction of one of the charging ports 25. Therefore, if a malfunction occurs, the battery charger 20 is capable of charging the remaining battery packs inserted into the functional ports of the battery charger 20.

Figure 7:
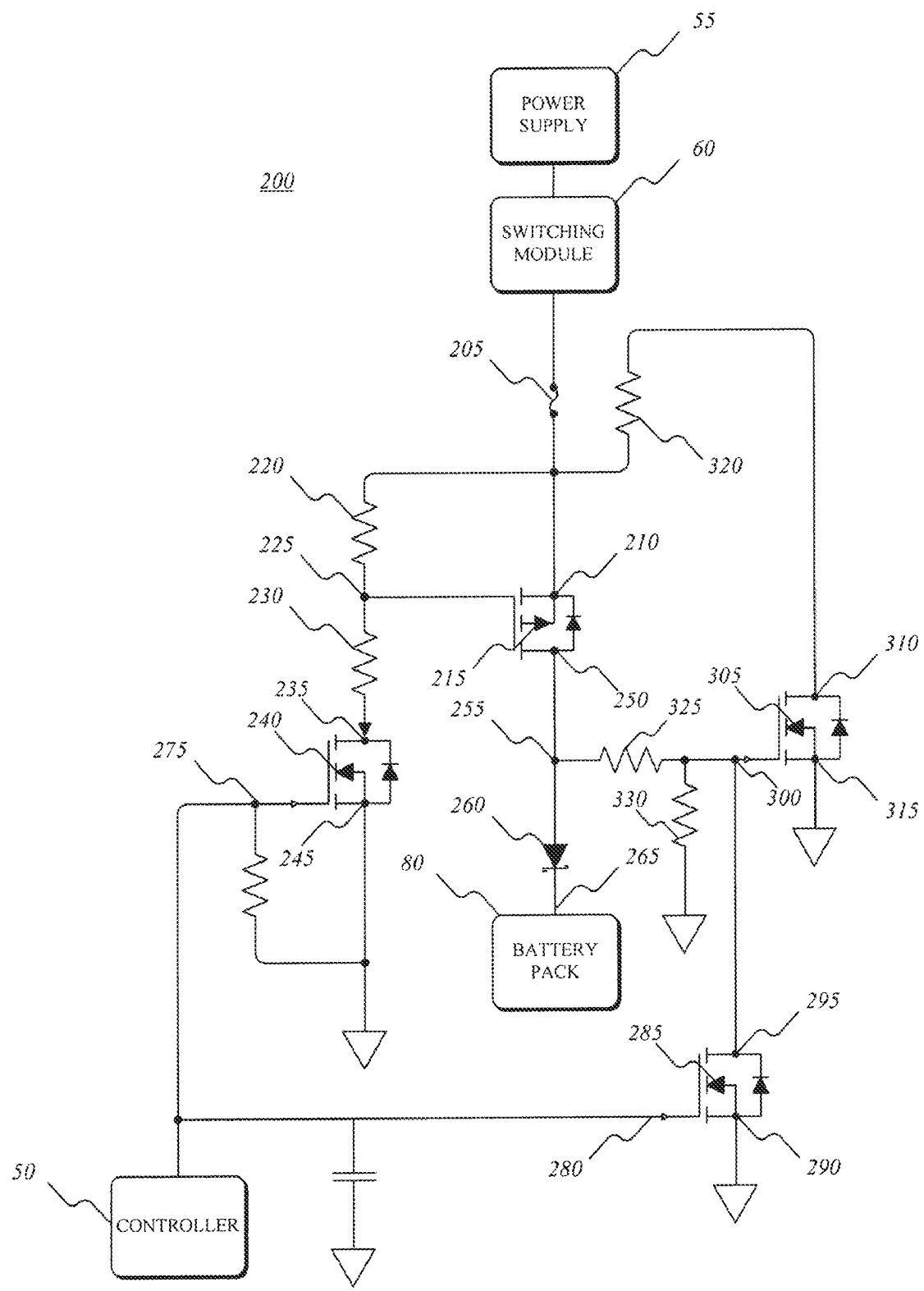
FIG. 7 illustrates a power control protection circuit according to an embodiment of the invention.

FIG. 7 illustrates the power control safety circuit 200 within a protection module 70. The power control safety circuit 200 is configured to prevent damage to a battery pack and/or a battery charger 20 in the event of a malfunction in one or more of the charging ports 25 without rendering the remaining functional charging ports inoperable. The power control safety circuit 200 includes a plurality of electrical components including resistors, capacitors, metal-oxide-semiconductor field-effect transistors ("MOSFETs"), and diodes. In other embodiments, relays or a combination of relays and MOSFETs are used. The power control safety circuit 200 provides protection to the battery charger 20 and the battery pack based on a plurality of gate voltages. The illustrated power control safety circuit 200 provides protection to a single charging port 25. The power control safety circuit 200 is able to be incorporated into battery chargers that include only a single charging port or battery chargers that include a plurality of charging ports (e.g., 2 charging ports, 4 charging ports, 6 charging ports, etc.). The additional power control safety circuits 200 used to protect additional charging ports within a battery charger have substantially similar configurations and include similar electrical components. In some embodiments, the electrical components vary in value among the charging ports 25, but the function of each of the power control safety circuits is substantially similar.

The power supply module 55 supplies a charging voltage and current to the power switching module 60 which, in turn, provides a charging voltage and current to the power control safety circuit 200 at a first end of a thermal fuse 205. In some embodiments of the invention, the power supply module 55 supplies up to a 38V charging voltage. In other embodiments, the power supply module 55 supplies different voltage levels. A second end of the thermal fuse 205 is connected to a source 210 of a first P-type MOSFET ("PMOSFET") 215. A first resistor 220 is positioned between the second end of the thermal fuse 205 and a gate 225 of the first PMOSFET 215. A second resistor 230 is positioned between the gate 225 of the first PMOSFET 215 and a drain 235 of a first N-type MOSFET ("NMOSFET") 240. The first and second resistors 220 and 230 form a voltage divider network that is operable to reduce the voltage at the gate 225 of the first PMOSFET 215. In the illustrated embodiment, the first resistor 220 has a greater resistance than the second resistor 230. The first PMOSFET 215 as well as the other MOSFETs described herein function as switches. When a sufficiently positive or negative gate-source voltage, $V_{gs}$, is applied, the MOSFETs are referred to as being in an "on" state. If an insufficient gate-source voltage, $V_{gs}$, is applied, the MOSFETs are referred to as being in an "off" state. The use of the terms "on" and "off" to describe the operational state of the MOSFETs will be used herein in combination with descriptions of applied voltages and current flow for each of the MOSFETs.

A gate-source voltage, $V_{gs}$, between the gate 225 and a source 210 of the first PMOSFET 215 that is less than the negative of the threshold voltage for the first PMOSFET 215 causes a P-type inversion layer (i.e., a P-type channel) to form in the first PMOSFET 215. If a P-type inversion layer is created, conventional current flows from the source 210 of the first PMOSFET 215 to the drain 250 of the first PMOSFET 215. If the gate-source voltage, $V_{gs}$, is not sufficiently negative (e.g., less negative than the negative of the threshold voltage for the first PMOSFET 215), no P-type inversion layer is created, and conventional current does not flow from the source 210 of the first PMOSFET 215 to the drain 250 of the PMOSFET 215. If the first PMOSFET 215 is in an "on" state, a charging current from the power supply module 55 flows through the first PMOSFET 215 to an anode 255 of a Schottky diode 260. The Schottky diode 260 prevents a fully-charged battery pack from back-feeding current through the first PMOSFET 215 to the power supply module 55 or a different port of the multi-port battery charger. A cathode 265 of the Schottky diode 260 is connected to a positive terminal of a battery pack 80. The Schottky diode 260 has a low forward voltage (i.e., voltage drop from the anode 255 to the cathode 265) and switches quickly from a conducting state to a non-conducting state. In other embodiments of the invention, different types of diodes are used.

As described above, the controller 50 detects the presence of the battery pack 80 in a charging port 25. Charging of the battery pack 80 is initiated when the controller 50 sends the charging signal to the power control safety circuit 200. The charging signal is sent to a gate 275 of the first NMOSFET 240 and a gate 280 of a second NMOSFET 285. The charging signal from the controller 50 is a positive voltage that is greater than the threshold voltage of both the first and second NMOSFETs 240 and 285. The source 245 of the first NMOSFET 240 is coupled to the ground of the battery charger, and the charging signal from the controller 50 provides a sufficient gate-source voltage, $V_{gs}$, to create an N-type inversion layer which allows conventional current to flow from the drain 235 of the first NMOSFET 240 to the source 245 of the first NMOSFET 240. When the first NMOSFET 240 is in an "on" state, the gate-source voltage, $V_{gs}$, of the first PMOSFET 215 becomes sufficiently negative (e.g., more negative than the negative threshold voltage) for a P-type inversion layer to be created. The P-type inversion layer allows conventional current (e.g., the charging current) to flow from the source 210 of the first PMOSFET 215 to the drain 250 of the first PMOSFET 215. When the first PMOSFET 215 is in an "on" state, the charging voltage and the charging current are present at the anode 255 of the Schottky diode 260.

The source 290 of the second NMOSFET 285 is coupled to the ground of the battery charger. The gate-source voltage, $V_{gs}$, of the second NMOSFET 285 is also sufficient to create an N-type inversion layer between a drain 295 and the source 290 of the second NMOSFET 285, and conventional current is able to flow from the drain 295 of the second NMOSFET 285 to the source 290 of the second NMOSFET 285. The drain 295 of the second NMOSFET 285 is connected to a gate 300 of a third NMOSFET 305. When the second NMOSFET 285 is in an "on" state, the voltage at the gate 300 of the third NMOSFET 305 is approximately 0V. As a consequence, the third NMOSFET 305 does not have a sufficient gate-source voltage, $V_{gs}$, to create an N-type inversion layer. Therefore, conventional current does not flow from a drain 310 of the third NMOSFET 305 to the source 315 of the third NMOSFET 305.

The drain 310 of the third NMOSFET 305 is connected to a first end of a control resistor 320, and the source 315 of the third NMOSFET 305 is coupled to the ground of the battery charger. A second end of the controlling resistor 320 is connected to the second end of the thermal fuse 205. The control resistor 320 is positioned adjacent to and is thermally coupled with the thermal fuse 205. The control resistor 320 is selected such that it produces a substantial amount of heat when current flows through it (e.g., enough heat to open the fuse).

The gate 300 of the third NMOSFET 305 is coupled to the anode 255 of the Schottky diode 260 through a voltage divider network. The voltage divider network includes a third resistor 325 positioned between the anode 255 of the Schottky diode 260 and the gate 300 of the third NMOSFET 305, and a fourth resistor 330 positioned between the gate 300 of the third NMOSFET 305 and the ground of the battery charger. In some embodiments of the invention, the third resistor 325 and the fourth resistor 330 have approximately the same resistance values. In other embodiments, the third resistor 325 and the fourth resistor 330 have different resistance values.

When the charging signal from the controller 50 is applied to the gates 275 and 280 of both the first and the second NMOSFETs 240 and 285, the power supply module 55 and the power switching module 60 continue to provide the charging current to the battery pack 80. The battery pack continues to charge until, for example, the controller 50 determines that the battery pack 80 has been fully charged, or the battery pack 80 is removed from the charging port. If the controller 50 has not or is not sending a charging signal to the power control safety circuit 200, but a malfunction has occurred (e.g., a short circuit), the power control safety circuit 200 is configured to disrupt the charging current to the positive battery terminal of the battery pack 270. If no charging signal is supplied by the controller 50, the gates 275 and 280 of the first and second NMOSFETs 240 and 285 do not have a sufficient gate-source voltage, $V_{gs}$, to create N-type inversion layers and allow conventional current to flow from the drains 235 and 295 to the sources 245 and 290 of the first and second NMOSFETs 240 and 285 (i.e., the first and second NMOSFETs are in "off" states). If the first NMOSFET 240 is in an "off" state, the first PMOSFET 215 does not have a sufficiently negative gate-source voltage, $V_{gs}$, to create a P-type inversion layer and allow conventional current to flow from the source 210 to the drain 250 of the first PMOSFET 215. If the second NMOSFET 285 is in an "off" state, the gate 300 of the third NMOSFET 305 is not coupled to ground.

As a consequence of the first PMOSFET 215 being in an "off" state, the charging current and the charging voltage are not present at the anode 255 of the Schottky diode 260. However, in the event of a malfunction (e.g., a short circuit) of the first PMOSFET 215, the charging current and the charging voltage may be present at the anode 255 of the Schottky diode 260 even if the controller 50 is not sending or has not sent a charging signal to the power control safety circuit 200. To prevent damage to the battery pack 80 and/or the battery charger, the power control safety circuit 200 is operable to disrupt the flow of current to the positive terminal of the battery pack 80. If the charging voltage and the charging current are present at the anode 255 of the Schottky diode 260 and the controller 50 is not applying the charging signal to the gate 280 of the second NMOSFET 285, the gate 300 of the third NMOSFET 305 is not coupled to the ground of the battery charger, and the voltage at the gate 300 of the third NMOSFET 305 is approximately equal to one-half of the charging voltage. The voltage present at the gate 300 of the third NMOSFET 305 is dependent upon the resistance values of the third and fourth resistors 325 and 330. In some embodiments, the third and fourth resistors 325 and 330 have approximately the same resistance value. In other embodiments, the third and fourth resistors 325 and 330 have different resistance values, and the voltage at the gate 300 of the third NMOSFET 305 is not approximately equal to one-half of the charging voltage.

If the second NMOSFET 285 is in the "off" state and the voltage at the gate 300 of the third NMOSFET 305 is at least as large as the threshold voltage, an N-type inversion layer is created in the third NMOSFET 305, and conventional current is able to flow from the drain 310 to the source 315 of the third NMOSFET 305. The control resistor 320 has a resistance value that is smaller than the resistance values of the third and fourth resistors 325 and 330 such that the control resistor 320 and the third NMOSFET 305 (when in an "on" state) provide a low impedance current path to the ground of the battery charger. A substantial portion of the charging current flows through the control resistor 320 and the third NMOSFET 305. The control resistor 320 has, for example, a resistance of less than 1 kohm and a power rating of ¼ W. As a result, the control resistor 320 produces a significant amount of heat in a short period of time. As described above, the control resistor 320 is thermally coupled to the thermal fuse 205. The heat generated by the control resistor 320 is sufficient to open circuit (e.g., blow) the thermal fuse 205. After the thermal fuse 205 has blown, the charging current is no longer able to flow through the shorted PMOSFET 215, and damage to the battery charger or battery pack is prevented.

Both the charging control process 100 and the power control safety circuit 200 described above rely, at least in part, on an accurate and reliable detection of the presence of a battery pack in a charging port. Each charging port 25 includes one or more battery pack detection devices or battery charger switches for determining when a battery pack is inserted into the battery charger 20, or alternatively, when a battery pack is removed from the battery charger 20. The battery charger switch allows the battery charger 20 to use minimal energy during a standby or low-power operational mode, and does not supply a charging voltage to positive or negative battery charging terminals until the switch is activated (e.g., closed). In one embodiment, the switch includes a first flexibly formed part, a second flexibly formed part, and an insulating part. The first and second flexibly formed parts are formed using an electrically conductive and flexible material (e.g., a metal). The insulating part is constructed of an electrical insulator and electrically isolates the first and second flexibly formed parts. The first flexibly formed part, the second flexibly formed part, and the insulating part are inexpensive (compared to off-the-shelf switches) stamped and formed parts that do not use a significantly greater amount of material than a standard clip used to secure a battery pack to a battery charger 20. In other embodiments of the invention, the first and second flexibly formed parts are molded.

Figure 8:
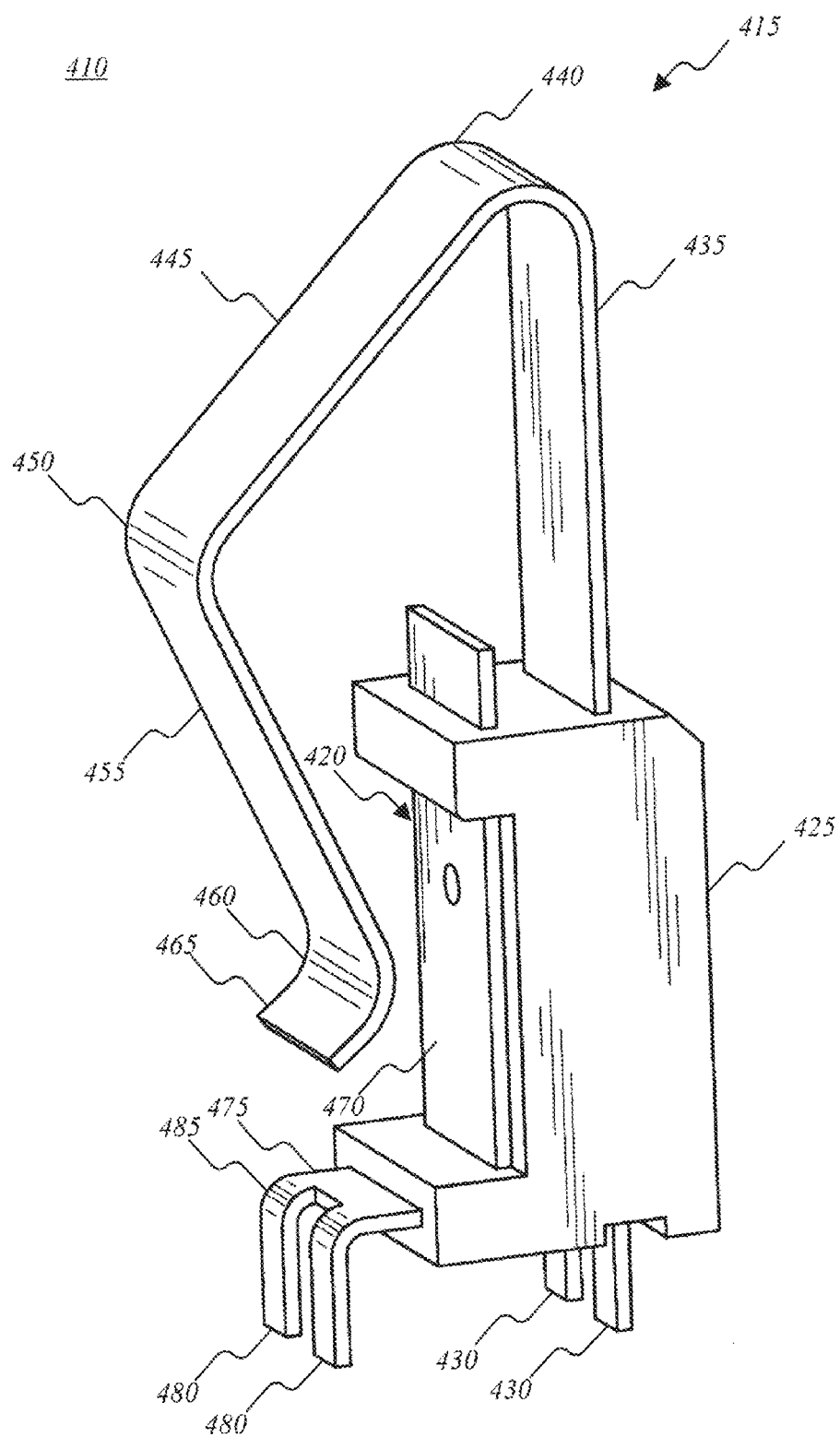
FIG. 8 illustrates a battery charger switch in an open position according to an embodiment of the invention.

A battery pack detection device or battery charger switch 410 according to such an embodiment is illustrated in an open position in FIG. 8. The switch 410 includes the first flexibly formed part 415, the second flexibly formed part 420, and the insulating part 425. The first flexibly formed part 415 includes first and second terminals 430 for contacting a conductor or attaching (e.g., soldering) the switch 410 to a device such as a PCB. In the illustrated embodiment, the first and second terminals 430 are connected to and collinear with a first straight portion 435 of the first flexibly formed part 415. In other embodiments, the first and second terminals 430 are configured in a non-collinear arrangement with respect to the first straight portion 435. The first straight portion 435 passes through an interior portion of the insulating part 425 and extends a first distance beyond the insulating part 425. In other embodiments, the first straight portion 435 is attached to an exterior portion of the insulating part 425. The length of the first straight portion 435 is approximately two times the length of the insulating part 425. The first straight portion 435 is connected to a first angled portion 440 of the first flexibly formed part 415. The first angled portion 440 includes an interior angle that is less than or equal to 90°. In other embodiments of the invention, the first angled portion 440 has an interior angle that is greater than or equal to 90°. The word "straight" is used for descriptive purposes herein and is not intended to imply that the straight portions of the battery charger switch are not capable of being, for example, flexed or bent while receiving an applied force.

A second straight portion 445 of the first flexibly formed part 415 is also connected to the first angled portion 440. The second straight portion 445 extends a length approximately equal to one-half the length of the first straight portion 435. The second straight portion 445 and the first straight portion 435 form an angle equal to the first angled portion 440's interior angle. A second angled portion 450 of the first flexibly formed part 415 is connected to the second straight portion 445. The second angled portion 450 includes an interior angle that is less than 180° and is, in some embodiments, approximately equal to 90°. In some instances, the second angled portion 450's interior angle is greater than the first angled portion 440's interior angle. In other embodiments, the second angled portion 450's interior angle is less than the first angled portion 440's interior angle. The second angled portion 450 is also connected to a third straight portion 455 of the first flexibly formed part 415. The third straight portion 455 is approximately equal in length to the second straight portion 445 and forms an angle with the second straight portion 445 that is equal to the second angled portion 450's interior angle. A third angled portion 460 of the first flexibly formed part 415 is also connected to the third straight portion 455 and includes an interior angle that is less than 180°. The third angled portion 460 is connected to a fourth straight portion 465 of the first flexibly formed part 415 which extends approximately parallel to the second straight portion 445. The fourth straight portion 465 and the third straight portion 455 form an angle that is equal to the third angled portion 460's interior angle.

The second flexibly formed part 420 includes a fifth straight portion 470 which is parallel to the first straight portion 435 and is approximately one-half the length of the first straight portion 435. The first straight portion 435 and the fifth straight portion 470 are separated and electrically isolated from each other by the insulating part 425. A sixth straight portion 475 is perpendicularly connected to the fifth straight portion 470. In the illustrated embodiment, the sixth straight portion 475 is shown passing through an interior portion of the insulating part 425. In other embodiments, the sixth straight portion 475 does not pass through the interior portion of the insulating part 425.

The second flexibly formed part 420 also includes third and fourth terminals 480 which are connected to the sixth straight portion 475 by a fourth angled portion 485. The fourth angled portion 485 forms an angle of approximately 90° between the sixth straight portion 475 and the third and fourth terminals 480. In the illustrated embodiment, the third and fourth terminals 480 are approximately parallel to the first and second terminals 430, the first straight portion 435, and the fifth straight portion 470. The third and fourth terminals 480 are configured to contact a conductor or be attached (e.g., soldered) to a PCB.

The insulating part 425 separates and electrically isolates the first flexibly formed part 415 and the second flexibly formed part 420. The insulating part 425 is, for example, a plastic material that is molded around the first flexibly formed part 415 and the second flexibly formed part 420. In other embodiments of the invention, the insulating part 425 is an adhesive tape or an alternative material that affixes the first flexibly formed part 415 to the second flexibly formed part 420 and provides for electrical isolation between the two parts.

The switch 410 does not require an exterior plastic housing like many of the off-the-shelf type switches. Off-the-shelf switches usually require plastic housings to prevent dust from disrupting the electrical connectivity of the switch. Off-the-shelf switches are designed with a standard housing (i.e., an enclosure with known sizes and dimensions) and are used in a wide variety of applications. However, in applications where space is limited, it is cumbersome to incorporate switches with an exterior enclosure. As such, a switch 410 without an exterior housing is advantageous. Additionally, because the first, second, third, and fourth terminals are directly connected (e.g., soldered) to a PCB, the switch 410 does not require wires to connect the battery charger switch to the PCB.

Figure 9:
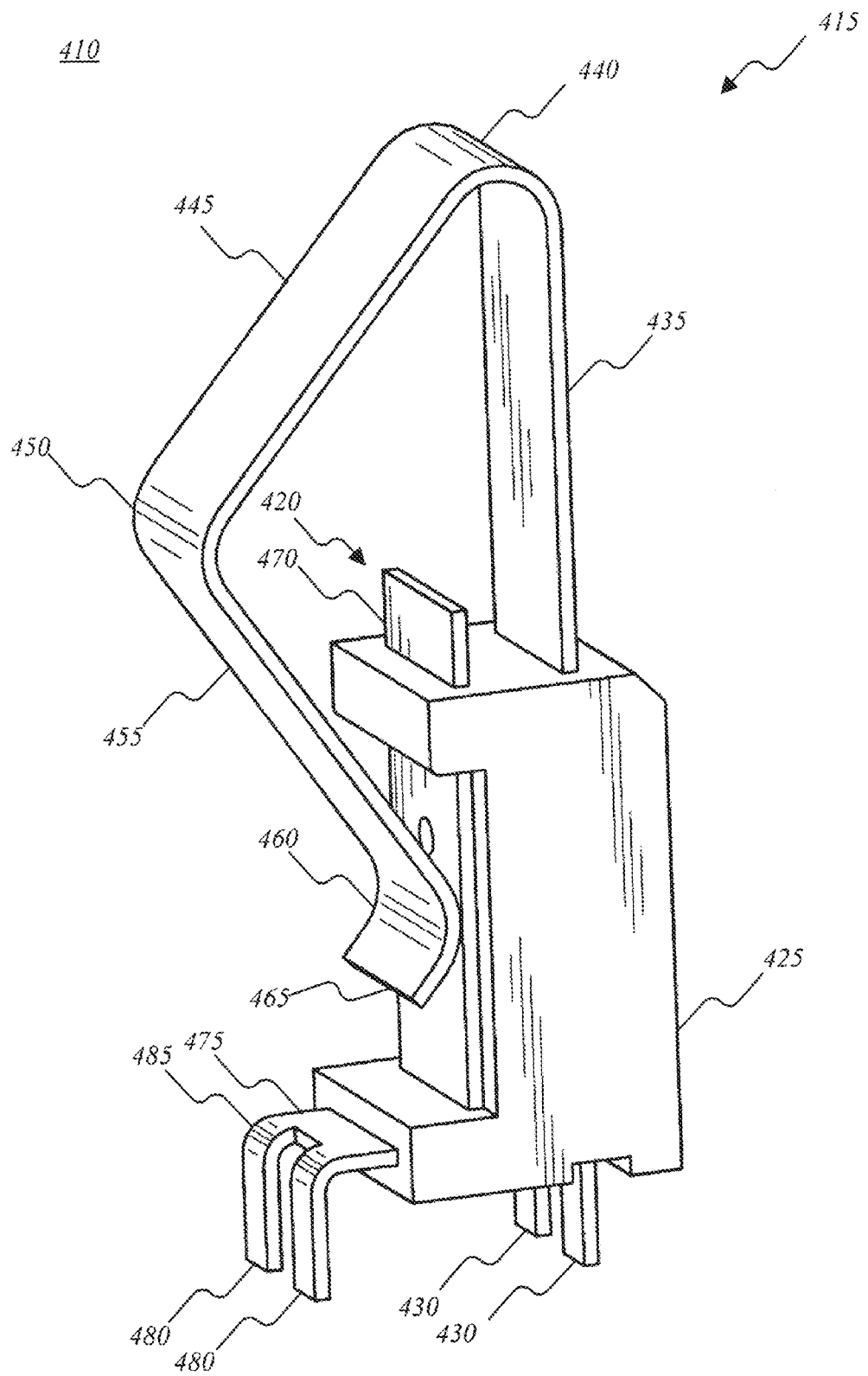
FIG. 9 illustrates the battery charger switch of FIG. 8 in a closed position according to an embodiment of the invention.

FIG. 9 illustrates the switch 410 in a closed position. The first and second terminals 430, the first straight portion 435, the second straight portion 445, the third straight portion 455, the fourth straight portion 465, the fifth straight portion 470, the sixth straight portion 475, the third and fourth terminals 480, and the fourth angled portion 485 are substantially similar in shape and orientation to above descriptions with respect to FIG. 8. However, the first flexibly formed part 415 and the second flexibly formed part 420 are separated or distanced from one another when in an open position. As shown in FIG. 9, the distance or separation between the first flexibly formed part 415 and the second flexibly formed part 420 has been traversed or spanned by the first flexibly formed part 415. The switch 410 is in the closed position when, for example, a battery pack is inserted into a charging port of the battery pack charger. When a battery pack is inserted into the charging port, the battery pack contacts the second straight portion 445. As the battery pack travels farther into the charging port, the battery pack exerts a force on the second straight portion 445 which is bent toward the first straight portion 435, and causes the first angled portion 440's interior angle to decrease.

The second angled portion 450, the third straight portion 455, the third angled portion 460, and the fourth straight portion 465 travel arcuately with respect to the first angled portion 440 towards the fifth straight portion 470 until the third angled portion 460 contacts the fifth straight portion 470. As the battery pack continues to exert a force on the second straight portion 445, the second angled portion 450's interior angle increases. The third angled portion 460 is then forced down the fifth straight portion 470 in a sweeping motion until the battery pack is securely inserted into the charging port. The sweeping motion of the third angled portion 460 has a plurality of functions. The sweeping motion is capable of clearing dust off of the fifth straight portion 470 that may have accumulated since the last time a battery pack was inserted into the battery charger. The sweeping motion also allows for a long contact-travel distance during which the switch 410 is activated. In the off-the-shelf switches, tolerances lead to electrical connectivity problems due to a relatively small range of motion through which the switch travels when the switch is activated. The large range of motion of the switch 410 ensures electrical connectivity in light of situations where battery packs are not precisely uniformly sized or shaped, or in the event that the battery pack wiggles or shakes while inserted in the battery charger.

Each of the charging ports 25 includes, for example, one or more standard clips and the battery charger switch 410. The standard clip is secured to the PCB using one or more soldered terminals, and the battery charger switch 410 is secured to the PCB via the first, second, third, and fourth terminals described above with respect to FIGS. 8 and 9. The terminals of the standard clip are connected to a positive power supply module terminal (e.g., a positive charging voltage terminal). The first and second terminals 430 of the switch 410 are connected to the negative reference power supply module terminal (e.g., 0V or ground). The third and fourth terminals 480 of the battery charger switch 410 are connected to the controller 50. The third and fourth terminals 480 are pulled up to a control voltage of, for example, 5.0V or 3.3V (i.e., a standard operating voltage for the controller 50). As such, the fifth straight portion 470 is also at the standard operating voltage. Due to the location of the switch 410 within a charging port 25 of the battery charger 20, the switch 410 is less susceptible to an erroneous activation which would cause the controller 50 to initiate a charging current. When the battery pack is inserted into the charging port 20, the switch 410 is closed and the voltage of the fifth straight portion 470 is pulled from the standard operating voltage to the negative charging terminal voltage (e.g., 0V or ground). The controller 50 detects the voltage change of the fifth straight portion 470 (via the third and fourth terminals 480) and determines that a battery pack has been inserted or is present in the charging port 25. After the controller 50 determines that a battery pack is present, the controller 50 is able to initiate a charging current. As a consequence of the controller 50 directly detecting the insertion of a battery pack, the power supply module 55 is maintained indefinitely at a low voltage waiting for the switch 410 to be closed. Therefore, the standby power required to operate the battery charger 20 is minimized, and the battery charger 20 is capable of meeting or exceeding government efficiency standards.

Figure 10:
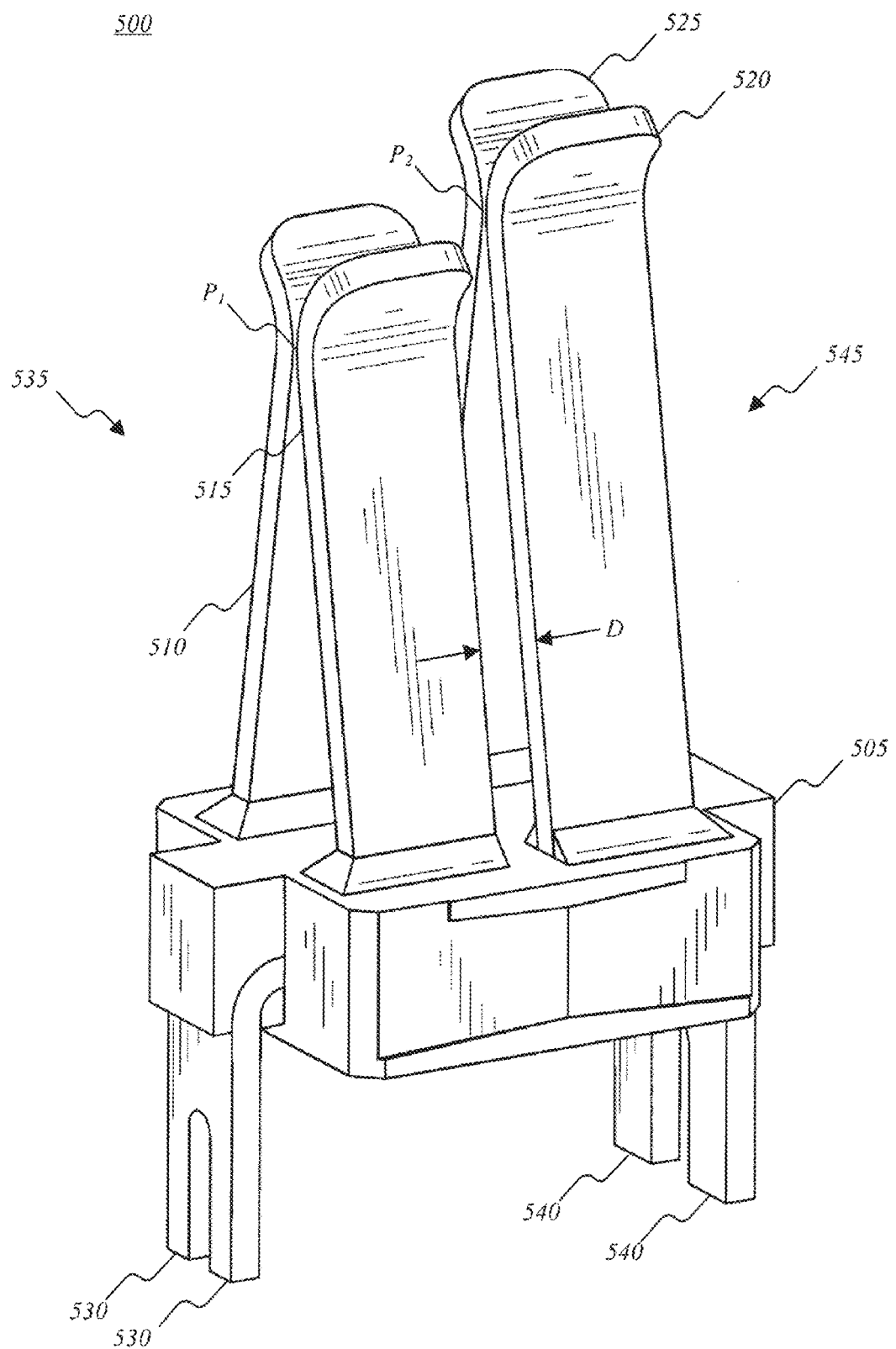
FIG. 10 illustrates a battery charger switch according to an embodiment of the invention.

FIG. 10 illustrates a battery charger switch 500 according to another embodiment. The switch 500 includes an insulating part 505, a first flexibly formed part 510, a second flexibly formed part 515, a third flexibly formed part 520, and a fourth flexibly formed part 525. Each of the first, second, third, and fourth flexibly formed parts are electrically conductive. The first, second, third, and fourth flexibly formed parts are generally illustrated as being straight, but are curved at a distal end or tip away from the insulating part 505. The curved ends allow for a battery pack to be more easily inserted into a charging port 25. The term "straight" is used for descriptive purposes and is not intended to imply that the straight portions of the battery charger switch 500 are not capable of being, for example, flexed or bent when receiving an applied force.

The first flexibly formed part 510 and the second flexibly formed part 515 are electrically connected to first and second terminals 530 for contacting a conductor or attaching (e.g., soldering) the switch 500 to a device, such as the PCB. In the illustrated embodiment, the first and second terminals 530 are connected to and perpendicular to the insulating part 505. In other embodiments, the first and second terminals 530 are configured in a non-perpendicular arrangement with respect to the insulating part 505. The first and second flexibly formed parts 510 and 515 pass through an interior portion of the insulating part 505 and extend a distance beyond the insulating part 505. The combination of the first flexibly formed part 510, the second flexibly formed part 515, and the first and second terminals 530 is referred to herein as a first conductive part 535.

The third flexibly formed part 520 and the fourth flexibly formed part 525 are electrically connected to third and fourth terminals 540 for contacting a conductor or attaching the switch to the PCB. In the illustrated embodiment, the third and fourth terminals 540 are connected and perpendicular to the insulating part 505, and approximately parallel to the first and second terminals 530. In other embodiments, the third and fourth terminals 540 are configured in a non-perpendicular arrangement with respect to the insulating part 505. The third and fourth flexibly formed parts 520 and 525 pass through an interior portion of the insulating part 505 and extend a distance beyond the insulating part 505. The combination of the third flexibly formed part 520, the fourth flexibly formed part 525, and the third and fourth terminals 540 is referred to herein as a second conductive part 545. In the illustrated embodiment, the second conductive part 545 extends a greater distance beyond the insulating part 505 than the first conductive part 535. As is described in greater detail below, the relative lengths of the first and second conductive parts 535 and 545 are selected to ensure that the ground or zero-potential terminal is contacted first by a battery pack being inserted into a charging port 25.

The insulating part 505 separates and electrically isolates the first conductive part 535 and the second conductive part 545. The insulating part 505 is, for example, a plastic material that is molded around the first conductive part 535 and the second conductive part 545. In other embodiments of the invention, the insulating part 505 is an adhesive tape or an alternative material that affixes the first conductive part 535 to the second conductive part 545 and provides electrical isolation between the first and second conductive parts 535 and 545.

The first conductive part 535 and the second conductive part 545 are separated from one another by a fixed distance, D. The distance, D, is selected to be small enough to reduce or minimize the footprint of the battery charger switch 500 on a PCB, and is selected to be large enough to prevent arcing from the first conductive part 535 to the second conductive part 545, or vice versa, when the first conductive part 535 and the second conductive part 545 are at different voltages.

The first and second flexibly formed parts 510 and 515 resiliently contact one another at a first junction point, $P_1$. The third and fourth flexibly formed parts 520 and 525 resiliently contact one another at a second junction point, $P_2$. The junction points $P_1$ and $P_2$ between the first and second flexibly formed parts 510 and 515 and the third and fourth flexibly formed parts 520 and 525, respectively, function as electrical contact points between the battery charger switch 500 and a battery pack inserted into a charging port 25. For example, when a battery pack is inserted into a charging port 25, a terminal (e.g., a negative or ground terminal) of a battery pack contacts the first and second conductive parts 535 and 545 at the curved distal ends of the first, second, third, and fourth flexibly formed parts. The relative length of the second conductive part 545 is greater than the length of the first conductive part 535 such that the second conductive part 545 is electrically connected to the battery pack before the first conductive part 535 is electrically connected to the battery pack. In one embodiment, the second conductive part 545 is at a ground or zero potential level, and the battery pack is therefore safely grounded before a voltage is applied to any of the battery pack's terminals. An insertion force of the battery pack into the charging port 25, and therefore into the battery charger switch 500, is sufficient for a terminal (e.g., a negative terminal) of the battery pack to flex or bend the first, second, third, and fourth flexibly formed parts, and break the contact between the first and second flexibly formed parts 510 and 515 and the third and fourth flexibly formed parts 520 and 525 at points $P_1$ and $P_2$, respectively. The battery pack terminal bridges the distance, D, between the first conductive part 535 and the second conductive part 545 to electrically connect the first conductive part 535 and the second conductive part 545. When the first conductive part 535 and the second conductive part 545 are electrically connected to one another, the first and second conductive parts 535 and 545 remain at the same voltage level. The controller 50 detects a change in the voltage of the first conductive part 545, determines that a battery pack is present in the charging port 25, and initiates a charging current in a manner similar to that described above with respect to the switch 410.

In a manner similar to the battery charger switch 410 described above with respect to FIGS. 8 and 9, the switch 500 does not require an exterior plastic housing to prevent, for example, dust from disrupting the electrical connectivity of the switch 500. Furthermore, because the first, second, third, and fourth terminals are directly connected (e.g., soldered) to the PCB, the switch 500 does not require wires to connect to the PCB.

The switches 410 and 500 also improve the efficiency of the battery charger 20 when a battery pack 80 is removed from the battery charger 20. For example and with reference to the process 100 described above with respect to FIGS. 4-6 and the switch 410, a battery charger 20 with a plurality of charging ports 25 for receiving a plurality of battery packs is configured to transition from charging a first battery pack to charging a second battery pack only when the first battery pack has reached a maximum charge. However, when a battery pack is removed from the battery charger 20, the voltage on the third and fourth terminals 480 of the switch 410 are pulled up from 0V to 5V, which indicates to the controller 50 that the battery pack is no longer inserted into the charging port 25. The transition from 0V to 5V functions as a signal to the controller 50 that a battery pack is no longer inserted in the battery charger 20, and that the battery charger 20 is to proceed to the next battery pack inserted in a charging port 25. Alternatively, if each of the battery packs inserted in the charging ports 25 of the battery charger 20 have been charged but not removed, the voltage of the switch 410 (i.e., the third and fourth terminals 480) for each charging port 25 of the battery charger 20 with a battery pack inserted therein, remains at 0V. The battery charger 20 then initiates a maintenance charge (e.g., a trickle charge) on all inserted battery packs for a predetermined period of time (e.g., 1 hour). If the battery packs are not removed after the battery charger has completed the maintenance charge, the controller 50 enters the standby mode to reduce energy consumption. The battery charger 20 does not exit the low-power operational mode until the controller 50 senses a high to low transition (e.g., from 5V to 0V) from the switch 410. In other embodiments, the battery charger 20 exits the low-power operational mode when a battery pack has been removed from a charging port 25.

As such, unlike conventional techniques for detecting the insertion of a battery pack into a charging port of a battery charger, the controller 50 requires less programming. For example, the controller 50 monitors the voltage of a pin (i.e., the pin to the third and fourth terminals 480 of the battery charger switch 410). If a voltage change is detected (e.g., 5V to 0V or 0V to 5V), the controller 50 executes a corresponding instruction. The controller 50 does not need to perform additional calculations or testing to determine whether a battery pack has been inserted into or removed from a charging port 25.

Thus, the invention provides, among other things, a compact and energy-efficient multi-port battery charger. The battery charger includes a controller configured to execute a charging process in which one of the multiple ports of the battery charger is charged at a time. A power control safety module associated with each of the multiple charging ports provides protection to the battery charger, and an inserted battery pack against, for example, a short circuit condition. The battery charger also includes at least one battery charger switch for each of the multiple ports which provides an indication to the controller of the presence of a battery pack in a port. Various features and advantages of the invention are set forth in the following claims.

What is claimed is:

1. A battery charger comprising:
    a housing including a plurality of charging ports, each of the plurality of charging ports configured to receive a battery pack;
    a power supply module electrically connected to a power source and configured to supply power to the battery charger,
    wherein the battery charger operates in a normal operational power mode and a low operational power mode;
    a controller configured to
    determine whether one or more of the plurality of charging ports is to receive a first charging current,
    determine whether one or more of the plurality of charging ports is to receive a second charging current, wherein the first charging current is greater than the second charging current, and
    operate the battery charger in the normal operational power mode when one or more of the plurality of charging ports is to receive the first charging current or the second charging current;
    at least one protection circuit including at least one semiconductor switch, the at least one semiconductor switch configured to prevent a charging current from being supplied to a charging port when a defect condition related to the charging port is detected; and
    a battery pack detection device positioned within at least one of the plurality of charging ports and electrically connected to the controller, the battery pack detection device configured to provide an indication to the controller of a presence of the battery pack in the at least one of the plurality of charging ports,
    wherein the battery pack detection device provides an electrical connection between the at least one of the plurality of charging ports and the battery pack.

2. The battery charger of claim 1, further comprising a power switching module configured to provide either the first charging current or the second charging current to one of the plurality of charging ports.

3. The battery charger of claim 2, wherein the controller is further configured to generate a charging signal to enable the power switching module to provide the charging current to the one of the plurality of charging ports.

4. The battery charger of claim 1, wherein the second charging current is a trickle charging current.

5. The battery charger of claim 1, wherein the controller is further configured to cycle through the plurality of charging ports in a serial manner to determine whether any of the plurality of charging ports is to receive the charging current.

6. A battery charger comprising:
    a housing including one or more charging ports, each of the one or more charging ports configured to receive a battery pack;
    a power supply module electrically connected to a power source and configured to supply power to the battery charger;
    a controller configured to receive an indication of a presence of the battery pack in one of the one or more charging ports;
    at least one protection circuit including at least one semiconductor switch, the at least one semiconductor switch configured to prevent a charging current from being supplied to a charging port when a defect condition related to the charging port is detected; and
    a battery pack detection device positioned within at least one of the one or more charging ports and electrically connected to the controller, the battery pack detection device including a first conductive part, a second conductive part, a first terminal, and a second terminal,
    wherein a voltage of the first terminal is a battery charger reference voltage, a voltage of the second terminal is a battery charger control voltage, and the first conductive part and the second conductive part are brought into electrical connection with one another when the battery pack is inserted into the at least one of the one or more charging ports, and
    wherein the voltage of the second terminal is reduced from the battery charger control voltage to the battery charger reference voltage after being brought into electrical connection with the first terminal.

7. The battery charger of claim 6, further comprising a power switching module configured to provide the charging current to one of the one or more charging ports.

8. The battery charger of claim 6, wherein the battery pack detection device further includes an insulating part electrically isolating the first conductive part from the second conductive part.

9. The battery charger of claim 8, wherein the first conductive part and the second conductive part are separated from one another by a distance.

10. The battery charger of claim 9, wherein the distance between the first conductive part and the second conductive part is spanned when the battery pack is inserted into the at least one of the one or more charging ports.

11. A battery charger comprising:
a housing including a plurality of charging ports, each of the plurality of charging ports configured to receive a battery pack;
a power supply module electrically connected to a power source and configured to supply power to the battery charger;
a controller configured to
select one of the plurality of charging ports that is to receive a charging current, and
generate a charging signal to enable the selected one of the plurality of charging ports to receive the charging current; and
at least one protection circuit configured to receive the charging signal from the controller when the at least one protection circuit is in a normal operational mode, the at least one protection circuit including a first semiconductor switch and a second semiconductor switch,
wherein the first semiconductor switch allows the charging current to be supplied to the at least one of the plurality of charging ports when the at least one protection circuit is receiving the charging signal from the controller, and
wherein the second semiconductor switch prevents the charging current from being supplied to the at least one of the plurality of charging ports when the at least one protection circuit is not receiving the charging signal from the controller.

12. The battery charger of claim 11, further comprising a power switching module configured to provide the charging current to one of the plurality of charging ports.

13. The battery charger of claim 11, wherein the at least one protection circuit further includes a fuse.

14. The battery charger of claim 13, wherein the second semiconductor switch causes the fuse to open when the charging current is being supplied to the at least one of the plurality of charging ports and the at least one protection circuit is not receiving the charging signal from the controller.

15. The battery charger of claim 11, wherein the charging current flows through the first semiconductor switch.

16. A battery charger comprising:
a housing including a plurality of charging ports, each of the plurality of charging ports configured to receive a battery pack;
a power supply module electrically connected to a power source and configured to supply power to the battery charger,
wherein the battery charger operates in a first operational power mode and a second operational power mode; and
a controller configured to execute a charging control process, the charging control process including
detecting an indication related to a presence of the battery pack in one of the plurality of charging ports,
determining whether one or more of the plurality of charging ports is to receive a first charging current,
determining whether one or more of the plurality of charging ports is to receive a second charging current, wherein the first charging current is greater than the second charging current,
operating the battery charger in the first operational power mode when at least one of the plurality of charging ports is to receive the first charging current or the second charging current,
generating a charging signal to enable one of the plurality of charging ports to receive the first charging current or the second charging current when the one of the plurality of charging ports is to receive the first charging current or the second charging current, and
operating the battery charger in the second operational power mode when none of the plurality of charging ports is to receive the first charging current or the second charging current.

17. The battery charger of claim 16, further comprising a power switching module configured to provide either the first charging current or the second charging current to one of the plurality of charging ports.

18. The battery charger of claim 16, wherein the second charging current is a trickle charging current.

19. The battery charger of claim 16, wherein the charging control process further includes cycling through the plurality of charging ports in a serial manner to determine whether one or more of the plurality of charging ports is to receive the first charging current or the second charging current.

20. The battery charger of claim 16, wherein the second operational power mode is a low power mode.

21. A battery charger comprising:
a housing including one or more charging ports, each of the one or more charging ports configured to receive a battery pack;
a power supply module electrically connected to a power source and configured to supply power to the battery charger;
a controller configured to receive an indication of a presence of the battery pack in one of the one or more charging ports, select one of the one or more charging ports that is to receive a charging current, and generate a charging signal to enable the selected one of the one or more charging ports to receive the charging current; and
a battery pack detection device positioned within at least one of the one or more charging ports and electrically connected to the controller, the battery pack detection device including a
a first conductive part coupled to a negative terminal of the power supply module,
a second conductive part coupled to the controller, and
an insulating part electrically isolating the first conductive part from the second conductive part;
wherein the first conductive part is bent toward the second conductive part when the battery pack is inserted into the at least one of the one or more charging ports.

22. The battery charger of claim 21, wherein the battery pack detection device provides, to the controller, the indication of the presence of the battery pack in one of the one or more charging ports.

23. The battery charger of claim 21, wherein the battery pack detection device provides an electrical connection between the at least one of the one or more charging ports and the battery pack.

24. The battery charger of claim 21, wherein a voltage of the first conductive part is a battery charger reference voltage and a voltage of the second conductive part is the battery charger control voltage.

25. The battery charger of claim 24, wherein the voltage of the second conductive part is reduced from the battery charger control voltage to the battery charger reference voltage when the battery pack is inserted into the at least one of the one or more charging ports.

26. A battery charger comprising:
a housing including one or more charging ports, each of the one or more charging ports configured to receive a battery pack;
a power supply module electrically connected to a power source and configured to supply power to the battery charger;
a controller configured to receive an indication of a presence of the battery pack in one of the one or more charging ports, select one of the one or more charging ports that is to receive a charging current, and generate a charging signal to enable the selected one of the one or more charging ports to receive the charging current; and
a battery pack detection device positioned within at least one of the one or more charging ports and electrically connected to the controller, the battery pack detection device including a
a first conductive part coupled to a negative terminal of the power supply module,
a second conductive part coupled to the controller,
wherein the first conductive part and the second conductive part are separated from one another by a fixed distance, and
an insulating part electrically insulating the first conductive part from the second conductive part;
wherein the fixed distance between the first conductive part and the second conductive part is bridged by a terminal of the battery pack when the battery pack is inserted into the at least one of the one or more charging ports.

27. The battery charger of claim 26, wherein the battery pack detection device provides the indication of the presence of the battery pack in one of the one or more charging ports to the controller.

28. The battery charger of claim 26, wherein the battery pack detection device provides an electrical connection between the at least one of the one or more charging ports and the battery pack.

29. The battery charger of claim 26, wherein a voltage of the first conductive part is a battery charger reference voltage and a voltage of the second conductive part is the battery charger control voltage.

30. The battery charger of claim 29, wherein the voltage of the second conductive part is reduced from the battery charger control voltage to the battery charger reference voltage when the battery pack is inserted into the at least one of the one or more charging ports.

* * * * *